(12) United States Patent
Olshansky

(10) Patent No.: US 10,963,841 B2
(45) Date of Patent: Mar. 30, 2021

(54) EMPLOYMENT CANDIDATE EMPATHY SCORING SYSTEM

(71) Applicant: On Time Staffing Inc., Golden Valley, MN (US)

(72) Inventor: Roman Olshansky, Plymouth, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

(21) Appl. No.: 16/366,703

(22) Filed: Mar. 27, 2019

(65) Prior Publication Data

US 2020/0311682 A1    Oct. 1, 2020

(51) Int. Cl.
| | | |
|---|---|---|
| *G06Q 10/10* | (2012.01) | |
| *G06F 40/20* | (2020.01) | |
| *G06K 9/00* | (2006.01) | |
| *G10L 15/26* | (2006.01) | |
| *G10L 25/63* | (2013.01) | |

(52) U.S. Cl.
CPC ......... *G06Q 10/1053* (2013.01); *G06F 40/20* (2020.01); *G06K 9/00315* (2013.01); *G06K 9/00335* (2013.01); *G06K 9/00711* (2013.01); *G10L 15/26* (2013.01); *G10L 25/63* (2013.01)

(58) Field of Classification Search
None
See application file for complete search history.

(56) References Cited

U.S. PATENT DOCUMENTS

| | | |
|---|---|---|
| 1,173,785 A | 2/1916 | Deagan |
| 1,686,351 A | 10/1928 | Spitzglass |

(Continued)

FOREIGN PATENT DOCUMENTS

| | | |
|---|---|---|
| AU | 2002310201 | 3/2003 |
| CA | 2206105 | 12/2000 |

(Continued)

OTHER PUBLICATIONS

Vikram Ramanarayanan et al. 2015. Evaluating Speech, Face, Emotion and Body Movement Time-series Features for Automated Multimodal Presentation Scoring. In Proceedings of the 2015 ACM on (ICMI '15). Association for Computing Machinery, New York, NY, USA, 23-30. (Year: 2015).*

(Continued)

*Primary Examiner* — Andrew B Whitaker
(74) *Attorney, Agent, or Firm* — Pauly, DeVries Smith & Deffner, LLC

(57) ABSTRACT

A system and method for determining a level of empathy of an employment candidate is provided. One aspect includes receiving video input, audio input, and behavioral data input of an interview for each of a plurality of candidates. Behavioral data is extracted from the behavioral data input. An audiovisual interview file is saved in a candidate database. In response to receiving a request to view a candidate profile, the system selects one candidate from among a plurality of candidates, the selecting based at least in part on the empathy score of the selected candidate. In another aspect, a candidate can answer multiple questions during a video interview. The behavioral data extracted from a first portion of the video interview can be compared to behavioral data from a second portion of the video interview.

17 Claims, 17 Drawing Sheets

(56) References Cited

U.S. PATENT DOCUMENTS

| | | |
|---|---|---|
| 3,152,622 A | 10/1964 | Rothermel |
| 3,764,135 A | 10/1973 | Madison |
| 5,109,281 A | 4/1992 | Kobori et al. |
| 5,410,344 A | 4/1995 | Graves et al. |
| 5,867,209 A | 2/1999 | Irie et al. |
| 5,884,004 A | 3/1999 | Sato et al. |
| 5,886,967 A | 3/1999 | Aramaki |
| 5,897,220 A | 4/1999 | Huang et al. |
| 5,906,372 A | 5/1999 | Recard, Jr. |
| 5,937,138 A | 8/1999 | Fukuda et al. |
| 5,949,792 A | 9/1999 | Yasuda et al. |
| 6,128,414 A | 10/2000 | Liu |
| 6,229,904 B1 | 5/2001 | Huang et al. |
| 6,289,165 B1 | 9/2001 | Abecassis |
| 6,484,266 B2 | 11/2002 | Kashiwagi et al. |
| 6,502,199 B2 | 12/2002 | Kashiwagi et al. |
| 6,504,990 B1 | 1/2003 | Abecassis |
| RE37,994 E | 2/2003 | Fukuda et al. |
| 6,600,874 B1 | 7/2003 | Fujita et al. |
| 6,618,723 B1 * | 9/2003 | Smith ............... G06Q 10/10 |
| 6,981,000 B2 | 12/2005 | Park et al. |
| 7,095,329 B2 | 8/2006 | Saubolle |
| 7,146,627 B1 | 12/2006 | Ismail et al. |
| 7,293,275 B1 | 11/2007 | Krieger et al. |
| 7,313,539 B1 | 12/2007 | Pappas et al. |
| 7,336,890 B2 | 2/2008 | Lu et al. |
| 7,499,918 B2 | 3/2009 | Ogikubo |
| 7,606,444 B1 | 10/2009 | Erol et al. |
| 7,702,542 B2 | 4/2010 | Aslanian, Jr. |
| 7,725,812 B1 | 5/2010 | Balkus et al. |
| 7,797,402 B2 | 9/2010 | Roos |
| 7,810,117 B2 | 10/2010 | Karnalkar et al. |
| 7,865,424 B2 | 1/2011 | Pappas et al. |
| 7,904,490 B2 | 3/2011 | Ogikubo |
| 7,962,375 B2 | 6/2011 | Pappas et al. |
| 7,991,635 B2 | 8/2011 | Hartmann |
| 7,996,292 B2 | 8/2011 | Pappas et al. |
| 8,032,447 B2 | 10/2011 | Pappas et al. |
| 8,046,814 B1 | 10/2011 | Badenell |
| 8,111,326 B1 | 2/2012 | Talwar |
| 8,169,548 B2 | 5/2012 | Ryckman |
| 8,185,543 B1 | 5/2012 | Choudhry et al. |
| 8,229,841 B2 | 7/2012 | Pappas et al. |
| 8,238,718 B2 | 8/2012 | Toyama et al. |
| 8,241,628 B2 | 8/2012 | Diefenbach-streiber et al. |
| 8,266,068 B1 | 9/2012 | Foss et al. |
| 8,300,785 B2 | 10/2012 | White |
| 8,301,550 B2 | 10/2012 | Pappas et al. |
| 8,301,790 B2 | 10/2012 | Morrison et al. |
| 8,326,133 B2 | 12/2012 | Lemmers |
| 8,331,457 B2 | 12/2012 | Mizuno et al. |
| 8,331,760 B2 | 12/2012 | Butcher |
| 8,339,500 B2 | 12/2012 | Hattori et al. |
| 8,358,346 B2 | 1/2013 | Hikita et al. |
| 8,387,094 B1 | 2/2013 | Ho et al. |
| 8,505,054 B1 | 8/2013 | Kirley |
| 8,508,572 B2 | 8/2013 | Ryckman et al. |
| 8,543,450 B2 | 9/2013 | Pappas et al. |
| 8,566,880 B2 | 10/2013 | Dunker et al. |
| 8,600,211 B2 | 12/2013 | Nagano et al. |
| 8,611,422 B1 | 12/2013 | Yagnik et al. |
| 8,620,771 B2 | 12/2013 | Pappas et al. |
| 8,633,964 B1 | 1/2014 | Zhu |
| 8,650,114 B2 | 2/2014 | Pappas et al. |
| 8,751,231 B1 | 6/2014 | Larsen et al. |
| 8,774,604 B2 | 7/2014 | Torii et al. |
| 8,792,780 B2 | 7/2014 | Hattori |
| 8,824,863 B2 | 9/2014 | Kitamura et al. |
| 8,854,457 B2 | 10/2014 | De Vleeschouwer et al. |
| 8,856,000 B1 | 10/2014 | Larsen et al. |
| 8,902,282 B1 | 12/2014 | Zhu |
| 8,909,542 B2 | 12/2014 | Montero et al. |
| 8,913,103 B1 | 12/2014 | Sargin et al. |
| 8,918,532 B2 | 12/2014 | Lueth et al. |
| 8,930,260 B2 | 1/2015 | Pappas et al. |
| 8,988,528 B2 | 3/2015 | Hikita |
| 9,009,045 B1 | 4/2015 | Larsen et al. |
| 9,015,746 B2 | 4/2015 | Holmdahl et al. |
| 9,026,471 B2 | 5/2015 | Pappas et al. |
| 9,026,472 B2 | 5/2015 | Pappas et al. |
| 9,047,634 B2 | 6/2015 | Pappas et al. |
| 9,064,258 B2 | 6/2015 | Pappas et al. |
| 9,070,150 B2 | 6/2015 | Pappas et al. |
| 9,092,813 B2 | 7/2015 | Pappas et al. |
| 9,106,804 B2 | 8/2015 | Roberts et al. |
| 9,111,579 B2 | 8/2015 | Meaney et al. |
| 9,117,201 B2 | 8/2015 | Kennell et al. |
| 9,129,640 B2 | 9/2015 | Hamer |
| 9,135,674 B1 | 9/2015 | Yagnik et al. |
| 9,223,781 B2 | 12/2015 | Pearson et al. |
| 9,224,156 B2 | 12/2015 | Moorer |
| 9,305,286 B2 | 4/2016 | Larsen et al. |
| 9,305,287 B2 | 4/2016 | Krishnamoorthy et al. |
| 9,378,486 B2 | 6/2016 | Taylor et al. |
| 9,398,315 B2 | 7/2016 | Oks et al. |
| 9,402,050 B1 | 7/2016 | Recchia et al. |
| 9,437,247 B2 | 9/2016 | Pendergast et al. |
| 9,438,934 B1 | 9/2016 | Zhu |
| 9,443,556 B2 | 9/2016 | Cordell et al. |
| 9,456,174 B2 | 9/2016 | Boyle et al. |
| 9,462,301 B2 | 10/2016 | Paśko |
| 9,501,663 B1 | 11/2016 | Hopkins, III et al. |
| 9,542,452 B1 | 1/2017 | Ross et al. |
| 9,554,160 B2 | 1/2017 | Han et al. |
| 9,583,144 B2 | 2/2017 | Ricciardi |
| 9,600,723 B1 | 3/2017 | Pantofaru et al. |
| 9,607,655 B2 | 3/2017 | Bloch et al. |
| 9,652,745 B2 | 5/2017 | Taylor et al. |
| 9,653,115 B2 | 5/2017 | Bloch et al. |
| 9,666,194 B2 | 5/2017 | Ondeck et al. |
| 9,684,435 B2 | 6/2017 | Carr et al. |
| 9,693,019 B1 | 6/2017 | Fluhr et al. |
| 9,710,790 B2 | 7/2017 | Taylor et al. |
| 9,723,223 B1 | 8/2017 | Banta et al. |
| 9,747,573 B2 | 8/2017 | Shaburov et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | Mccauley et al. |
| 9,936,185 B2 | 4/2018 | Delvaux et al. |
| 9,940,973 B2 | 4/2018 | Roberts et al. |
| 9,979,921 B2 | 5/2018 | Holmes |
| 10,008,239 B2 | 6/2018 | Eris |
| 10,019,653 B2 | 7/2018 | Wilf et al. |
| 10,021,377 B2 | 7/2018 | Newton et al. |
| 10,108,932 B2 | 10/2018 | Sung et al. |
| 10,115,038 B2 | 10/2018 | Hazur et al. |
| 10,147,460 B2 | 12/2018 | Ullrich |
| 10,152,695 B1 | 12/2018 | Chiu et al. |
| 10,152,696 B2 | 12/2018 | Thankappan et al. |
| 10,168,866 B2 | 1/2019 | Wakeen et al. |
| 10,178,427 B2 | 1/2019 | Huang |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,346,805 B2 | 7/2019 | Taylor et al. |
| 10,346,928 B2 | 7/2019 | Li et al. |
| 10,353,720 B1 | 7/2019 | Wich-Vila |
| 10,438,135 B2 | 10/2019 | Larsen et al. |
| 10,694,097 B1 | 6/2020 | Shirakyan |
| 10,728,443 B1 | 7/2020 | Olshansky |
| 2001/0001160 A1 | 5/2001 | Shoff et al. |
| 2001/0038746 A1 | 11/2001 | Hughes et al. |
| 2002/0097984 A1 | 7/2002 | Abecassis |
| 2002/0113879 A1 | 8/2002 | Battle et al. |
| 2002/0122659 A1 | 9/2002 | Mcgrath et al. |
| 2002/0191071 A1 | 12/2002 | Rui et al. |
| 2003/0005429 A1 | 1/2003 | Colsey |
| 2003/0027611 A1 | 2/2003 | Recard |
| 2003/0189589 A1 | 10/2003 | Leblanc et al. |

(56) References Cited

U.S. PATENT DOCUMENTS

| | | |
|---|---|---|
| 2003/0194211 A1 | 10/2003 | Abecassis |
| 2004/0033061 A1 | 2/2004 | Hughes et al. |
| 2004/0186743 A1 | 9/2004 | Cordero |
| 2004/0264919 A1 | 12/2004 | Taylor et al. |
| 2005/0137896 A1 | 6/2005 | Pentecost et al. |
| 2005/0187765 A1 | 8/2005 | Kim et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0100919 A1 | 5/2006 | Levine |
| 2006/0116555 A1 | 6/2006 | Pavlidis et al. |
| 2006/0229896 A1 | 10/2006 | Rosen et al. |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2008/0086504 A1 | 4/2008 | Sanders et al. |
| 2009/0083103 A1* | 3/2009 | Basser .................. G06Q 10/00 705/7.39 |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0248685 A1 | 10/2009 | Pasqualoni et al. |
| 2009/0258334 A1 | 10/2009 | Pyne |
| 2010/0086283 A1 | 4/2010 | Ramachandran et al. |
| 2010/0183280 A1 | 7/2010 | Beauregard et al. |
| 2010/0191561 A1 | 7/2010 | Jeng et al. |
| 2010/0199228 A1* | 8/2010 | Latta .................. G06F 3/011 715/863 |
| 2010/0223109 A1 | 9/2010 | Hawn et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1* | 3/2011 | Erbey .................. G06Q 40/00 705/35 |
| 2011/0076656 A1 | 3/2011 | Scott et al. |
| 2011/0088081 A1 | 4/2011 | Folkesson et al. |
| 2011/0135279 A1 | 6/2011 | Leonard |
| 2012/0036127 A1 | 2/2012 | Work et al. |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0218688 A1 | 8/2013 | Roos |
| 2013/0222601 A1 | 8/2013 | Engstroem et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker, Jr. et al. |
| 2013/0268452 A1 | 10/2013 | Macewen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1 | 12/2013 | Clark et al. |
| 2013/0332382 A1 | 12/2013 | Lapasta et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0153902 A1 | 6/2014 | Pearson et al. |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1* | 7/2014 | Greaney .................. G06Q 10/1053 705/321 |
| 2014/0245146 A1 | 8/2014 | Roos |
| 2014/0258288 A1 | 9/2014 | Work et al. |
| 2014/0270706 A1 | 9/2014 | Pasko |
| 2014/0278506 A1* | 9/2014 | Rogers .................. G16H 40/63 705/2 |
| 2014/0278683 A1 | 9/2014 | Kennell et al. |
| 2014/0282709 A1 | 9/2014 | Hardy et al. |
| 2014/0317126 A1 | 10/2014 | Work et al. |
| 2014/0325359 A1 | 10/2014 | Vehovsky et al. |
| 2014/0325373 A1 | 10/2014 | Kramer et al. |
| 2014/0327779 A1 | 11/2014 | Eronen et al. |
| 2014/0330734 A1 | 11/2014 | Sung et al. |
| 2014/0336942 A1 | 11/2014 | Pe'er et al. |
| 2014/0337900 A1 | 11/2014 | Hurley |
| 2014/0356822 A1 | 12/2014 | Hoque et al. |
| 2014/0359439 A1 | 12/2014 | Lyren |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1* | 2/2015 | Danson .................. G06Q 10/1053 705/321 |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1* | 6/2015 | Geritz .................. G06Q 10/00 705/326 |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0269165 A1 | 9/2015 | Work et al. |
| 2015/0269529 A1* | 9/2015 | Kyllonen .................. G06Q 10/1053 705/321 |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0313892 A1 | 10/2016 | Roos |
| 2016/0323608 A1 | 11/2016 | Bloch et al. |
| 2016/0330398 A1 | 11/2016 | Recchia et al. |
| 2017/0026667 A1 | 1/2017 | Pasko |

(56) References Cited

U.S. PATENT DOCUMENTS

| | | |
|---|---|---|
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1* | 8/2017 | Borisyuk ............... G06N 20/00 706/12 |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | Mccauley et al. |
| 2018/0011621 A1 | 1/2018 | Roos |
| 2018/0025303 A1* | 1/2018 | Janz ................... G06Q 10/0639 705/2 |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | Mccoy et al. |
| 2018/0110460 A1 | 4/2018 | Danson et al. |
| 2018/0114154 A1 | 4/2018 | Bae |
| 2018/0130497 A1 | 5/2018 | Mccauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1* | 8/2018 | Viirre ....................... G06N 3/02 |
| 2018/0226102 A1 | 8/2018 | Roberts et al. |
| 2018/0227501 A1 | 8/2018 | King |
| 2018/0253697 A1* | 9/2018 | Sung ................... G06Q 10/1053 |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336930 A1 | 11/2018 | Takahashi |
| 2018/0350405 A1 | 12/2018 | Marco et al. |
| 2018/0374251 A1 | 12/2018 | Mitchell et al. |
| 2018/0376225 A1 | 12/2018 | Jones et al. |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0259002 A1 | 8/2019 | Balasia et al. |
| 2019/0311488 A1 | 10/2019 | Sareen |
| 2020/0012350 A1 | 1/2020 | Tay |
| 2020/0126545 A1* | 4/2020 | Kakkar ............... G06K 9/00302 |
| 2020/0143329 A1 | 5/2020 | Gamaliel |
| 2020/0311953 A1 | 10/2020 | Olshansky |
| 2020/0396376 A1 | 12/2020 | Olshansky |

FOREIGN PATENT DOCUMENTS

| | | |
|---|---|---|
| CA | 2763634 | 12/2012 |
| CN | 109146430 | 1/2019 |
| EP | 1775949 | 12/2007 |
| JP | 2009258175 | 11/2009 |
| JP | 2019016192 | 1/2019 |
| WO | 9703366 | 1/1997 |
| WO | 9713367 | 4/1997 |
| WO | 9828908 | 7/1998 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011007011 | 1/2011 |
| WO | 2011035419 | 3/2011 |
| WO | 2011129578 | 10/2011 |
| WO | 2011136571 | 11/2011 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |

OTHER PUBLICATIONS

"Non-Final Office Action," for U.S. Appl. No. 16/366,746 dated Aug. 22, 2019 (53 pages).

"Response to Non Final Office Action," for U.S. Appl. No. 16/366,746, filed Nov. 21, 2019 (12 pages).

International Search Report and Written Opinion for PCT Application No. PCT/US2020/024470 dated Jul. 9, 2020 (13 pages).

International Search Report and Written Opinion for PCT Application No. PCT/US2020/024722 dated Jul. 10, 2020 (13 pages).

Response to Non Final Office Action for U.S. Appl. No. 16/696,781, filed Jul. 6, 2020 (14 pages).

"International Search Report and Written Opinion," for PCT Application No. PCT/US2020/024488 dated May 19, 2020 (14 pages).

"Non-Final Office Action," for U.S. Appl. No. 16/696,781 dated Apr. 7, 2020 (43 pages).

"Final Office Action," for U.S. Appl. No. 16/696,781 dated Oct. 8, 2020 (26 pages).

(56) References Cited

OTHER PUBLICATIONS

"Non-Final Office Action," for U.S. Appl. No. 16/828,578 dated Sep. 24, 2020 (39 pages).
"Response to Final Office Action," for U.S. Appl. No. 16/696,781, filed Dec. 8, 2020 (18 pages).
Advantage Video Systems, "Jeffrey Stansfield of AVS interviews rep about Air-Hush products at the 2019 NAMM Expo," YouTube video, available at https://www.youtube.com/watch?v=nWzrM99gk_o, accessed Jan. 17, 2021.
"Final Office Action," for U.S. Appl. No. 16/828,578 dated Jan. 14, 2021 (27 pages).
"Non-Final Office Action," for U.S. Appl. No. 16/696,781 dated Jan. 26, 2021 (28 pages).
"Non-Final Office Action," for U.S. Appl. No. 17/025,902 dated Jan. 29, 2021 (59 pages).
"Notice of Allowance," for U.S. Appl. No. 16/931,964 dated Feb. 2, 2021 (42 pages).
"Response to Advisory Action," for U.S. Appl. No. 16/696,781, filed Jan. 8, 2021 (22 pages).
"Response to Non Final Office Action," for U.S. Appl. 16/828,578, filed Dec. 22, 2020 (17 pages).

\* cited by examiner

EMPLOYMENT CANDIDATE EMPATHY SCORING SYSTEM

BACKGROUND

The competitive nature of employment staffing means businesses must be efficient in their interviewing and hiring practices, and mindful of retaining quality staff. Some employers use a long manual interview process with multiple rounds of in-person interviews to assess candidates. This can cause them to lose the best candidates because their hiring process is too long. And businesses that bring the wrong candidates forward for time-intensive interviews can end up wasting valuable time. Other businesses have tried to streamline and automate their hiring practices. But streamlining comes at the expense of fully assessing potential candidates, which can lead to hiring the wrong candidate. Additionally, when choosing between two qualified candidates for a particular role, it is difficult to know which candidate has a higher likelihood of remaining with the new employer.

SUMMARY

In some examples, a method includes receiving video input, audio input, and behavioral data input of an interview for each of a plurality of candidates, each candidate having a digital profile in a candidate database; storing an audiovisual interview file for each candidate in the candidate's respective digital profile; extracting behavioral data from the behavioral data input of each of the plurality of candidates; applying an empathy score model to the behavioral data to determine an empathy score for each candidate; storing the empathy score in each candidate's respective digital profile; receiving a request from a user to view a digital profile; in response to receiving the request, selecting a digital profile for a selected candidate among the plurality of candidates, the selecting based at least in part on the empathy score of the selected candidate; and sending the selected candidate's audiovisual interview file to be displayed to the user.

In some examples, the behavioral data input is a portion of the audio input, the behavioral data is extracted using speech to text, and the behavioral data is word choice. In some examples, the behavioral data is biometric data. In some examples, the biometric data is a quantitative measurement of the candidate's body posture during recording of the interview. Some examples further include the step of extracting two or more types of behavioral data, the behavioral data includes facial expression, body posture, vocal tone patterns, word patterns, or length of time of speaking. Some examples further include: for each candidate, receiving resume text and storing the text in the candidate's candidate profile; analyzing the resume text to determine a career engagement score for each candidate; and in response to receiving the request to view a digital profile, selecting the digital profile for the selected candidate among the plurality of candidates further based at least in part on content in the resume text.

In some examples, the empathy score model is generated by: recording a plurality of interviews of individuals in a control group; extracting a set of behavioral data from the interview recordings, the set of behavioral data corresponding to multiple behavioral variables; performing a regression analysis on the set of behavioral data of the control group to determine one or more behavioral variables that correspond to a degree of empathy; and selecting a subset of behavioral variables to be used in the empathy score model; the behavioral data extracted from the interview recording of each of the plurality of candidates corresponds to the selected subset of behavioral variables. In some examples, a method of building an empathy scoring model, the method is included, the method receiving video input, audio input, and behavioral data input of an interview for each of a plurality of candidates; extracting behavioral data from the video input, the audio input, or the behavioral data input; and performing regression analysis on the extracted behavioral data to identify variables among the behavioral data that correspond to a degree of empathy of the candidate, the variables are weighted based on a correlation to the degree of empathy; and storing the empathy scoring model to be applied to candidates in a candidate database. In some examples, the method further includes extracting behavioral data from both the behavioral data input and the audio input.

In some examples, each of the audiovisual interview files is a recording of an interview in which a candidate provides verbal answers to multiple interview questions on camera. In some examples, the audiovisual interview file is segmented into clips corresponding to the candidate's answers to individual interview questions, further can include: extracting first behavioral data from the behavioral data input or the audio input of a first clip corresponding to a first interview question; extracting second behavioral data from the behavioral data input or the audio input of a second clip corresponding to an answer for a second interview question; and graphically displaying the extracted first behavioral data compared to the extracted second behavior data.

In some examples, a method includes receiving a plurality of audiovisual interview files for a first plurality of candidates; receiving behavioral data input for each of the candidates, the behavioral data input recorded synchronously with the video in the audiovisual interview files; extracting first behavioral data for each candidate from the behavioral data input; performing regression analysis on the first behavioral data to determine variables among the behavioral data that correspond to a degree of empathy of the candidate in the video; creating a scoring model that scores a candidate's level of empathy based on the determined variables; receiving audiovisual interview files for a second plurality of candidates; receiving behavioral data input for each of the second plurality of candidates, the behavioral data input recorded synchronously with the video in the audiovisual interview files of the second plurality of candidates; extracting second behavioral data from the behavioral data input for each candidate among the second plurality of candidates, the second behavioral data corresponding to variables found to correspond to a degree of empathy; applying the scoring model to the second behavioral data for the second plurality of candidates to determine an empathy score for each of the second plurality of candidates; receiving a request from a user to view a profile for a candidate among the second plurality of candidates; in response to receiving the request, selecting a candidate from among the second plurality of candidates, the selection based in part on the empathy score of the selected candidate; and sending the selected candidate's audiovisual interview file to be displayed to the user.

In some examples, the first plurality of candidates is a control group of ideal candidates. In some examples, the first plurality of candidates is a group selected from the general population. In some examples, each audiovisual interview file contains video recorded by at least two different cameras. In some examples, the second behavioral data includes data input received from at least two different sensors.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

DETAILED DESCRIPTION

Figure 1:
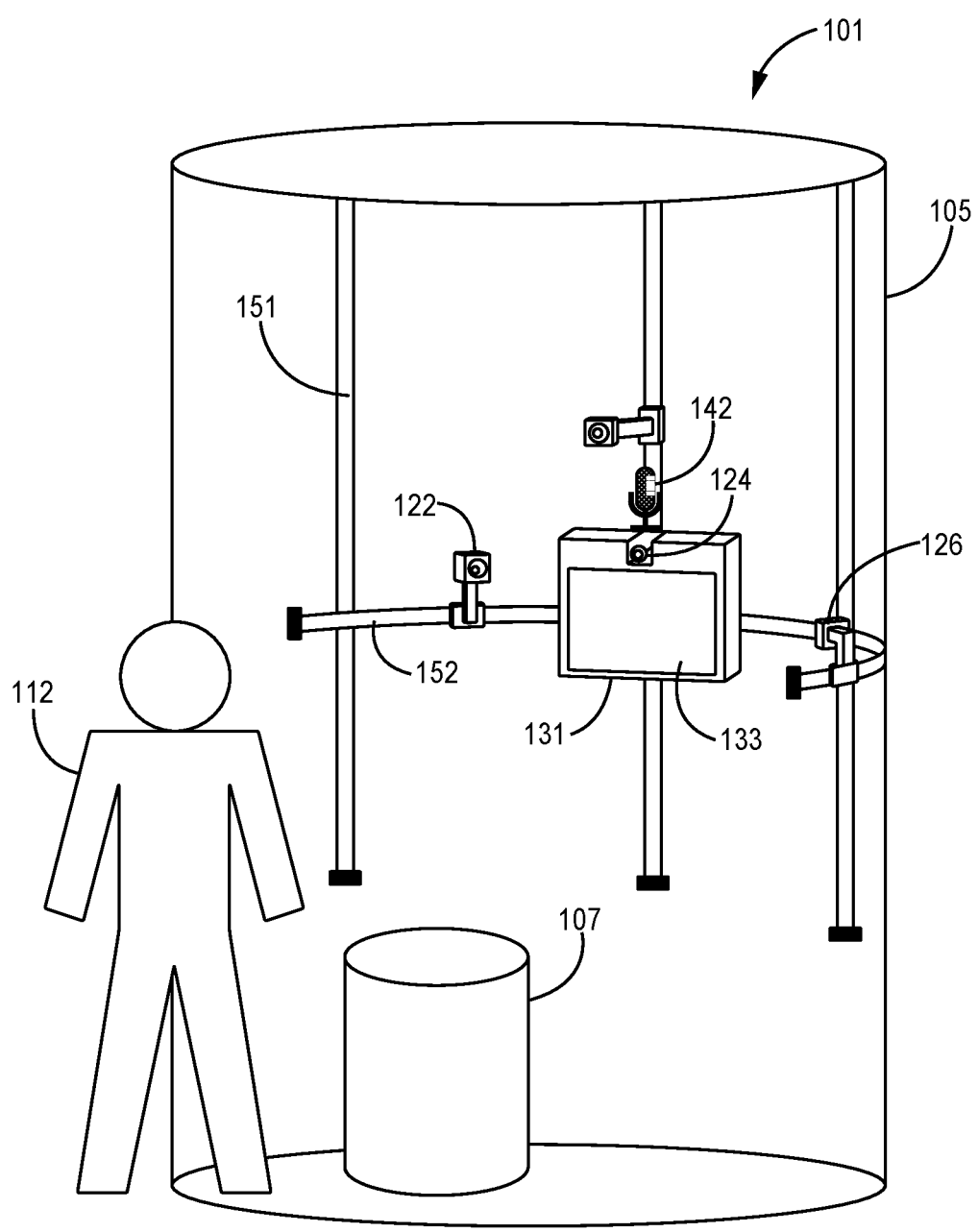
FIG. 1 is a perspective view of a multi-camera kiosk according to some examples.

The present disclosure relates to a computer system and method for use in the employment field. The disclosed technology is used to select job candidates that meet desired specifications for a particular employment opening, based on quantitatively measured characteristics of the individual job candidate. In healthcare, an important component of a successful clinician is the capacity for empathy. The technology disclosed herein provides an objective measure of a candidate's empathy using video, audio, and/or behavioral data recorded during a video interview of the candidate. An empathy score model can be created, and the recorded data can be applied to the empathy score model to determine an empathy score for the job candidate. In another aspect, an attention to detail and a career engagement score can be determined for the candidate. When combined, this is referred to as an "ACE" score, which combines scores for Attention to detail, Career engagement, and Empathy.

The system can also include a computer interface for presenting potential job candidates to prospective employers. From the user interface, the prospective employer can enter a request to view one or more candidates having qualities matching a particular job opening. In response to the request, the computer system can automatically select one or more candidates' video interviews and send the one or more video interviews over a computer network to be displayed at the user interface. Users can access this information from multiple types of user interfaces, including personal computers, laptops, tablet computers, and smart phones.

The computer system can include a computer having a processor in a computer memory. The computer memory can store a database containing candidate digital profiles for multiple job candidates. The memory can also store computer instructions for performing the methods described in relation to the described technology. The candidate digital profiles can include candidate personal information such as name and address, career-related information such as resume information, one or more audiovisual files of a video interview conducted by the candidate, and one or more scores related to behavioral characteristics of the candidate. The information in the candidate digital profile can be used when the system is automatically selecting the candidate video interviews to be displayed on the user computer.

The method can be performed while an individual job candidate is being recorded with audio and video, such as in a video interview. In some examples, the video interview is recorded in a kiosk specially configured to perform the functions described in relation to the disclosed technology. Although the computer system and method will be described in the context of a video interview of an employment candidate, other uses are contemplated and are within the scope of the technology. For example, the system could be applied to recording individuals who are performing entertaining or informative speaking, giving lectures, or other settings in which an individual is being recorded with video and audio.

In one aspect of the technology, the system receives video, audio, and behavioral data recorded of a candidate while the candidate is speaking. In some examples, the system uses a kiosk with multiple video cameras to record video images, a microphone to record audio, and one or more sensors to detect behaviors of the candidate during the interview. As used herein, a sensor could be one of a number of different types of measuring devices or computer processes to extract data. One example of a sensor is the imaging sensor of the video camera. In this case, behavioral data could be extracted from the digital video images recorded by the imaging sensor. Another example of a sensor is an infrared sensor that captures motion, depth, or other physical information using electromagnetic waves in the infrared or near-infrared spectrum. Various types of behavioral data can be extracted from input received from an infrared sensor, such as facial expression detection, body movement, body posture, hand gestures, and many other physical attributes of an individual. A third example of a sensor is the microphone that records audio of a candidate's speech. Data extracted from the audio input can include the candidate's vocal tone, speech cadence, or the total time spent speaking. Additionally, the audio can be analyzed using speech to text technology, and the words chosen by the candidate while speaking can be analyzed for word choice, word frequency, etc. Other examples of sensors that detect physical behaviors are contemplated and are within the scope of the technology.

In one aspect of the technology, the system is used during a video interview of a job candidate. Particular predetermined interview questions are presented to the candidate, and the candidate answers the questions orally while being recorded using audio, video, and behavioral data sensors. In some examples, the nature of a particular question being asked of the candidate determines the type of behavioral data to be extracted while the candidate is answering that question. For example, at the beginning of the interview when the candidate is answering the first interview question, the system can use the measurements as a baseline to compare the candidate's answers at the beginning of the interview to the answers later in the interview. As another example, a particular interview question can be designed to stimulate a particular type of emotional response from the candidate. Behavioral data recorded while the candidate is answering that interview question can be given more weight in determining an empathy for score for the candidate.

Some examples further include receiving information in addition to video, audio, and behavioral data. For example, written input such as resume text for the job candidate can be used as a factor in determining the suitability of a candidate for particular job opening. The system can also receive text or quantitative scores received from questionnaires filled out by the candidate or filled out by another individual evaluating the candidate. This type of data can be used similarly to the behavioral data to infer characteristics about the candidate, such as the candidate's level of attention to detail, and the candidate's level of career engagement.

In another aspect, the disclosed technology provides a computer system and method for creating an empathy scoring model, and applying the empathy scoring model to behavioral data of a candidate. In this method, the system receives data input for a population of candidates. The data input can include video, audio, and behavior data input recording during video interviews of each of candidates.

In some examples, the particular population of candidates is selected based on the candidates' suitability for a particular type of employment. For example, the candidates can be a group of healthcare professionals that are known to have a high degree of desirable qualities such as empathy. In alternative examples, the population of candidates can be selected from the general population; in this case, it would be expected that some candidates have a higher degree of desirable qualities, and some candidates have a lower degree of desirable qualities.

In either case, the system extracts behavioral data from the data inputs. A regression analysis is performed on the extracted behavioral data. This allows the system to identify particular variables that correspond to a degree of empathy of the candidate. The system then compiles a scoring model with weighted variables based on the correlation of empathy to the extracted quantitative behavioral data. The scoring model is stored in a candidate database. After the scoring model has been created, it can be applied to new data for job candidates.

The system applies the scoring model by receiving behavioral data input from the candidate and extracting behavioral data from the behavioral data input. The extracted behavioral data corresponds to variables found to be relevant to scoring the candidate's empathy. The extracted behavioral data is then compared to the model, and a score is calculated for the candidate. This score can be stored in the candidate's candidate digital profile along with a video interview for the candidate. This process is repeated for many potential employment candidates, and each candidate's score is stored in a digital profile, and accessible by the system.

Kiosk System for Recording Audiovisual Interviews

In some examples, the disclosed technology can be used in conjunction with a kiosk for recording audio and video of an individual. The kiosk includes multiple cameras, a microphone, and one or more sensors for receiving behavioral data. The kiosk system can be capable of producing audiovisual files from the recorded data. The kiosk can be an enclosed booth with a plurality of recording devices. For example, the kiosk can include multiple cameras, microphones, and sensors for capturing video, audio, and behavioral data of an individual. The video and audio data can be combined to create audiovisual files for a video interview. Behavioral data can be captured by the sensors in the kiosk and can be used to supplement the video interview, allowing the system to analyze subtle factors of the candidate's abilities and temperament that are not immediately apparent from viewing the individual in the video and listening to the audio.

Some examples of the technology provide an enclosed soundproof booth. The booth can contain owner more studio spaces for recording a video interview. Multiple cameras inside of the studio capture video images of an individual from multiple camera angles. A microphone captures audio of the interview. A system clock can be provided to synchronize the audio and video images. Additional sensors can be provided to extract behavioral data of the individual during the video interview. For example, an infrared sensor can be used to sense data corresponding to the individual's body movements, gestures, or facial expressions. The behavioral data can be analyzed to determine additional information about the candidate's suitability for particular employment. A microphone can provide behavioral data input, and the speech recorded by the microphone can be extracted for behavioral data, such as vocal pitch and vocal tone, word patterns, word frequencies, and other information conveyed in the speaker's voice and speech. The behavioral data can be combined with the video interview for a particular candidate and stored in a candidate database. The candidate database can store profiles for many different job candidates, allowing hiring managers to have the flexibility of choosing from a large pool of candidates.

In some examples, the kiosk is provided with a local edge server for processing the inputs from the camera, microphone, and sensors. The edge server includes a processor, memory, and a network connection device for communication with a remote database server. This setup allows the system to produce audiovisual interview files and a candidate evaluation as soon as the candidate has finished recording the interview. In some examples, processing of the data input occurs at the local edge server. This includes turning raw video data and audio data into audiovisual files, and extracting behavioral data from the raw sensor data received at the kiosk. In some examples, the system minimizes the load on the communication network by minimizing the amount of data that must be transferred from the local edge server to the remote server. Processing this information locally, instead of sending large amounts of data to a remote network to be processed, allows for efficient use of the network connection. The automated nature of the process used to produce audiovisual interview files and condense the received data inputs reduces server waste.

In some examples, two or more cameras are provided to capture video images of the individual during the video interview. In some examples, three cameras are provided: a right side camera, a left side camera, and a center camera. In some examples, each camera has a sensor capable of recording body movement, gestures, or facial expression. In some examples, the sensors can be infrared sensors such as depth sensors. A system with three depth sensors can be used to generate 3D models of the individual's movement. For example, the system can analyze the individual's body posture by compiling data from three sensors. This body posture data can then be used to extrapolate information about the individual's emotional state during the video interview, such as whether the individual was calm or nervous, or whether the individual was speaking passionately about a particular subject.

In another aspect, the system can include multiple kiosks at different locations remote from each other. Each kiosk can have an edge server, and each edge server can be in communication with a remote candidate database server. The kiosks at the different locations can be used to create video interviews for multiple job candidates. These video interviews can then be sent from the multiple kiosks to the remote candidate database to be stored for later retrieval. Having a separate edge server at each kiosk location allows for faster queries, making the latest content available more quickly than any type of traditional video production system.

Users at remote locations can request to view information for one or more job candidates. Users can access this information from multiple channels, including personal computers, laptops, tablet computers, and smart phones. For example, a hiring manager can request to view video interviews for one or more candidates for a particular job opening. The candidate database server can use a scoring system to automatically determine which candidates' video interviews to send to the hiring manager for review. This automatic selection process can be based in part on analyzed behavioral data that was recorded during the candidate's video interview.

Combining Video and Audio Files

The disclosed technology can be used with a system and method for producing audiovisual files containing video that automatically cuts between video footage from multiple cameras. The multiple cameras can be arranged during recording such that they each focus on a subject from a different camera angle, providing multiple viewpoints of the subject. The system can be used for recording a person who is speaking, such as in a video interview. Although the system will be described in the context of a video interview, other uses are contemplated and are within the scope of the technology. For example, the system could be used to record educational videos, entertaining or informative speaking, or other situations in which an individual is being recorded with video and audio.

Some implementations provide a kiosk or booth that houses multiple cameras and a microphone. The cameras each produce a video input to the system, and the microphone produces an audio input. A time counter provides a timeline associated with the multiple video inputs and the audio input. The timeline enables video input from each camera to be time-synchronized with the audio input from the microphone.

Multiple audiovisual clips are created by combining video inputs with a corresponding synchronized audio input. The system detects events in the audio input, video inputs, or both the audio and video inputs, such as a pause in speaking corresponding to low-audio input. The events correspond to a particular time in the synchronization timeline. To automatically assemble audiovisual files, the system concatenates a first audiovisual clip and a second audiovisual clip. The first audiovisual clip contains video input before the event, and the second audiovisual clip contains video input after the event. The system can further create audiovisual files that concatenate three or more audiovisual clips that switch between particular video inputs after predetermined events.

One example of an event that can be used as a marker for deciding when to cut between different video clips is a drop in the audio volume detected by the microphone. During recording, the speaker may stop speaking briefly, such as when switching between topics, or when pausing to collect their thoughts. These pauses can correspond to a significant drop in audio volume. In some examples, the system looks for these low-noise events in the audio track. Then, when assembling an audiovisual file of the video interview, the system can change between different cameras at the pauses. This allows the system to automatically produce high quality, entertaining, and visually interesting videos with no need for a human editor to edit the video interview. Because the quality of the viewing experience is improved, the viewer is likely to have a better impression of a candidate or other speaker in the video. A higher quality video better showcases the strengths of the speaker, providing benefits to the speaker as well as the viewer.

In another aspect, the system can remove unwanted portions of the video automatically based on the contents of the audio or video inputs, or both. For example, the system may discard portions of the video interview in which the individual is not speaking for an extended period of time. One way this can be done is by keeping track of the length of time that the audio volume is below a certain volume. If the audio volume is low for an extended period of time, such as a predetermined number of seconds, the system can note the time that the low noise segment begins and ends. A first audiovisual clip that ends at the beginning of the low noise segment can be concatenated with a second audiovisual clip that begins at the end of the low noise segment. The audio input and video inputs that occur between the beginning and end of the low noise segment can be discarded. In some examples, the system can cut multiple pauses from the video interview, and switch between camera angles multiple times. This eliminates dead air and improves the quality of the video interview for a viewer.

In another aspect, the system can choose which video input to use in the combined audiovisual file based on the content of the video input. For example, the video inputs from the multiple cameras can be analyzed to look for content data to determine whether a particular event of interest takes place. As just one example, the system can use facial recognition to determine which camera the individual is facing at a particular time. The system then can selectively prefer the video input from the camera that the individual is facing at that time in the video. As another example, the system can use gesture recognition to determine that the individual is using their hands when talking. The system can selectively prefer the video input that best captures the hand gestures. For example, if the candidate consistently pivots to the left while gesturing, a right camera profile shot might be subjectively better than minimizing the candidate's energy using the left camera feed. Content data such as facial recognition and gesture recognition can also be used to find events that the system can use to decide when to switch between different camera angles.

In another aspect, the system can choose which video input to use based on a change between segments of the interview, such as between different interview questions.

Video Interview Kiosk (FIG. 1)

FIG. 1 shows a kiosk 101 for recording a video interview of an individual 112. The kiosk 101 is generally shaped as an enclosed booth 105. The individual 112 can be positioned inside of the enclosed booth 105 while being recorded. Optionally, a seat 107 is provided for the individual 112. The kiosk 101 houses multiple cameras, including a first camera 122, a second camera 124, and a third camera 126. Each of the cameras is capable of recording video of the individual 112 from different angles. In the example of FIG. 1, the first camera 122 records the individual 112 from the left side, the second camera 124 records the individual 112 from the center, and the third camera 126 records the individual 112 from the right side. In some examples, the camera 124 can be integrated into a user interface 133 on a tablet computer 131. The user interface 133 can prompt the individual to answer interview questions. A microphone 142 is provided for recording audio.

The first, second, and third cameras 122, 124, 126 can be digital video cameras that record video in the visible spectrum using, for example, a CCD or CMOS image sensor. Optionally, the cameras can be provided with infrared sensors or other sensors to detect depth, movement, etc.

In some examples, the various pieces of hardware can be mounted to the walls of the enclosed booth 105 on a vertical support 151 and a horizontal support 152. The vertical support 151 can be used to adjust the vertical height of the cameras and user interface, and the horizontal support 152 can be used to adjust the angle of the cameras 122, 124, 126.

Figure 2:
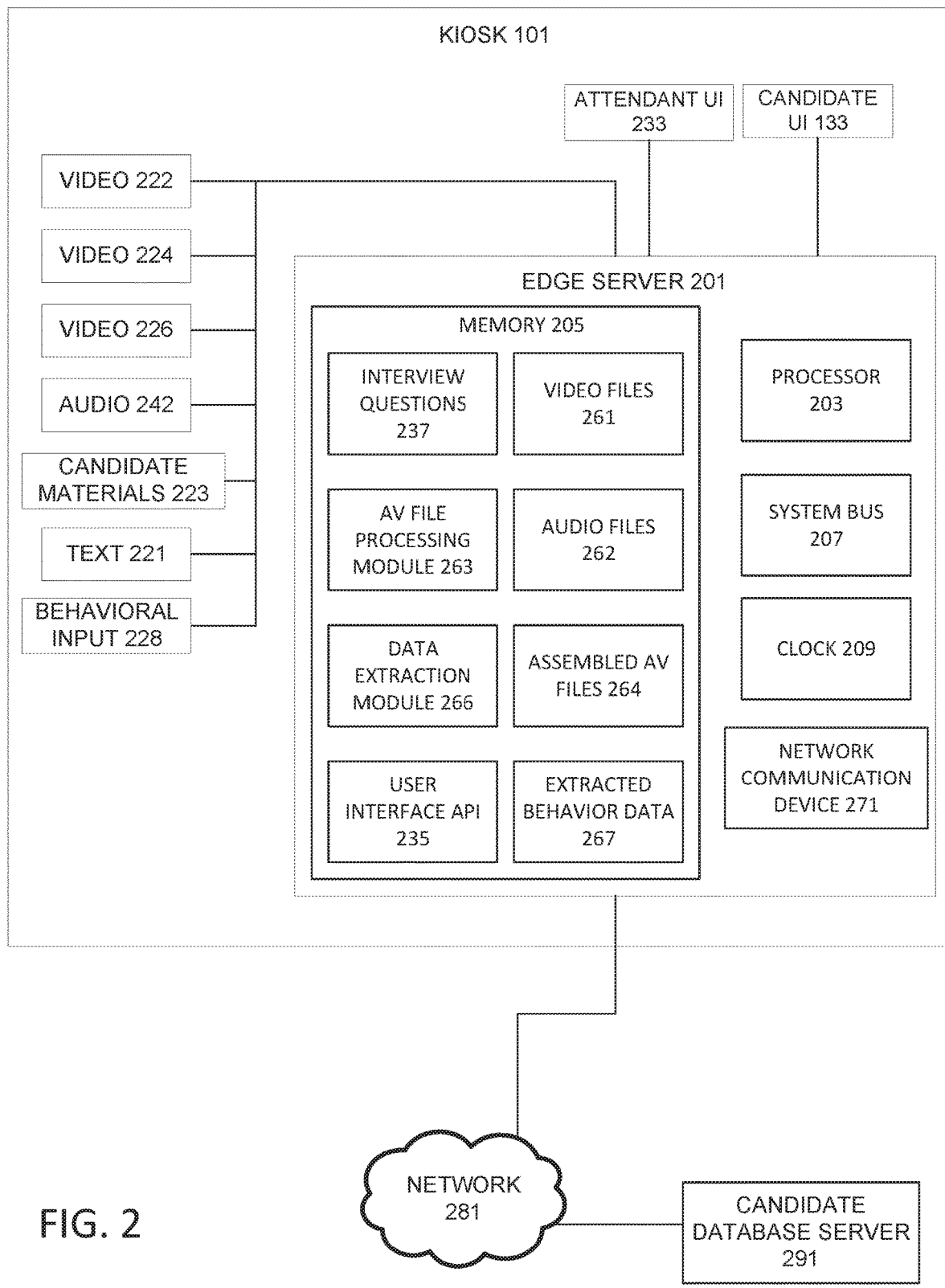
FIG. 2 is a schematic view of a kiosk system according to some examples.

Schematic of Kiosk and Edge Server (FIG. 2)

FIG. 2 shows a schematic diagram of one example of the system. The kiosk 101 includes an edge server 201 that has a computer processor 203, a system bus 207, a system clock 209, and a non-transitory computer memory 205. The edge server 201 is configured to receive input from the video and audio devices of the kiosk and process the received inputs.

The kiosk 101 can further include the candidate user interface 133 in data communication with the edge server 201. An additional user interface 233 can be provided for a kiosk attendant. The attendant user interface 233 can be used, for example, to check in users, or to enter data about the users. The candidate user interface 133 and the attendant user interface 233 can be provided with a user interface application program interface (API) 235 stored in the memory 205 and executed by the processor 203. The user interface API 235 can access particular data stored in the memory 205, such as interview questions 237 that can be displayed to the individual 112 on in the user interface 133. The user interface API 235 can receive input from the individual 112 to prompt a display of a next question once the individual has finished answering a current question.

The system includes multiple types of data inputs. In one example, the camera 122 produces a video input 222, the camera 124 produces a video input 224, and the camera 126 produces a video input 226. The microphone 142 produces an audio input 242. The system also receives behavioral data input 228. The behavioral data input 228 can be from a variety of different sources. In some examples, the behavioral data input 228 is a portion of data received from one or more of the cameras 122, 124, 126. In other words, the system receives video data and uses it as the behavioral data input 228. In some examples, the behavioral data input 228 is a portion of data received from the microphone 142. In some examples, the behavioral data input 228 is sensor data from one or more infrared sensors provided on the cameras 122, 124, 126. The system can also receive text data input 221 that can include text related to the individual 112, and candidate materials 223 that can include materials related to the individual's job candidacy, such as a resume.

In some examples, the video inputs 222, 224, 226 are stored in the memory 205 of the edge server 201 as video files 261. In alternative examples, the video inputs 222, 224, 226 are processed by the processor 203, but are not stored separately. In some examples, the audio input 242 is stored as audio files 262. In alternative examples, the audio input 242 is not stored separately. The candidate materials input 223, text data input 221, and behavioral data input 228 can also be optionally stored or not stored as desired.

In some examples, the edge server 201 further includes a network communication device 271 that enables the edge server 201 to communicate with a remote network 281. This enables data that is received and/or processed at the edge server 201 to be transferred over the network 281 to a candidate database server 291.

The edge server 201 includes computer instructions stored on the memory 205 to perform particular methods. The computer instructions can be stored as software modules. As will be described below, the system can include an audiovisual file processing module 263 for processing received audio and video inputs and assembling the inputs into audiovisual files and storing the assembled audiovisual files 264. The system can include a data extraction module 266 that can receive one or more of the data inputs (video inputs, audio input, behavioral input, etc.) and extract behavior data 267 from the inputs and store the extracted behavior data 267 in the memory 205.

Automatically Creating Audiovisual Files from Two or More Video Inputs (FIGS. 3-7)

The disclosed system and method provide a way to take video inputs from multiple cameras and arrange them automatically into a single audiovisual file that cuts between different camera angles to create a visually interesting product.

Figure 3:
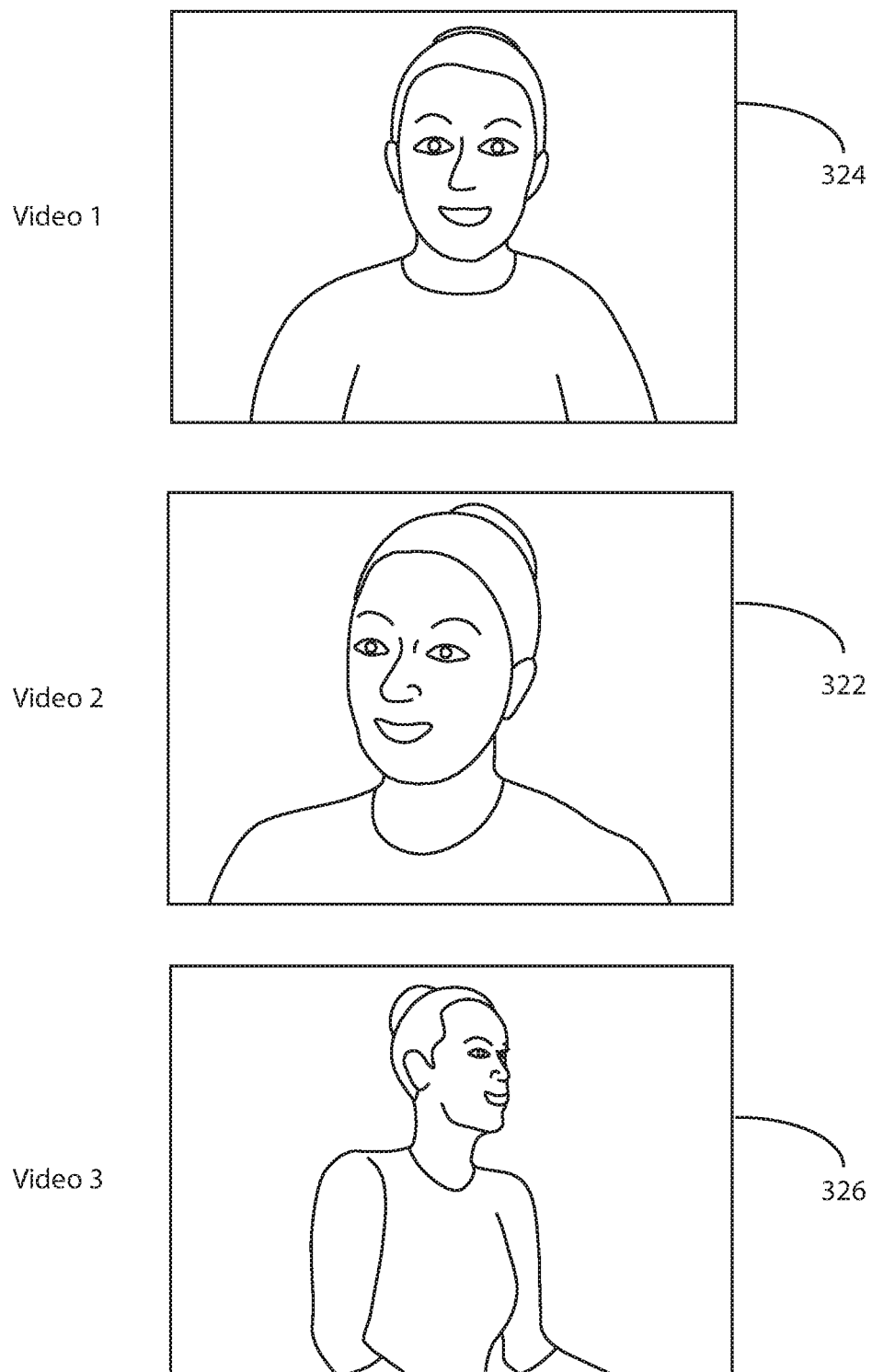
FIG. 3 illustrates an example of multiple video inputs.

FIG. 3 illustrates video frames of video inputs received from different cameras. In this example, video frame 324 is part of the video input 224 that is received from the second camera 124, which focuses on the individual 112 from a front and center angle. This video input is designated as "Video 1" or simply "Vid1." The video frame 322 is part of the video input 222 from the first camera 122, which focuses on the individual 112 from the individual 112's left side. This video input is designated as "Video 2" or simply "Vid2." The video frame 326 is part of the video input 226 from the third camera 126, which focuses on the individual 112 from the individual 112's right side. This video input is designated as "Video 3" or simply "Vid3." These video inputs can be provided using any of a number of different types of video coding formats. These include but are not limited to MPEG-2 Part 2, MPEG-4 Part 2, H.264 (MPEG-4 Part 10), HEVC, and AV1.

Audio inputs 242 can also be provided using any of a number of different types of audio compression formats. These can include but are not limited to MP1, MP2, MP3, AAC, ALAC, and Windows Media Audio.

The system takes audiovisual clips recorded during the video interview and concatenates the audiovisual clips to create a single combined audiovisual file containing video of an individual from multiple camera angles. In some implementations, a system clock 209 creates a timestamp associated with the video inputs 222, 224, 226 and the audio input 242 that allows the system to synchronize the audio and video based on the timestamp. A custom driver can be used to combine the audio input with the video input to create an audiovisual file.

As used herein, an "audiovisual file" is a computer-readable container file that includes both video and audio. An audiovisual file can be saved on a computer memory, transferred to a remote computer via a network, and played back at a later time. Some examples of video encoding formats for an audiovisual file compatible with this disclosure are MP4 (mp4, m4a, mov); 3GP (3gp, 3gp2, 3g2, 3gpp, 3gpp2); WMV (wmv, wma); AVI; and QuickTime.

As used herein, an "audiovisual clip" is a video input combined with an audio input that is synchronized with the video input. For example, the system can record an individual 112 speaking for a particular length of time, such as 30 seconds. In a system that has three cameras, three audiovisual clips could be created from that 30 second recording: a first audiovisual clip can contain the video input 224 from Vid1 synchronized with the audio input 242 from t=0 to t=30 seconds. A second audiovisual clip can contain the video input 222 from Vid2 synchronized with the audio input 242 from t=0 to t=30 seconds. A third audiovisual clip can contain the video input 226 from Vid3 synchronized with the audio input 242 from t=0 to t=30 seconds; Audiovisual clips can be created by processing a video input stream and an audio input stream which are then stored as an audiovisual file. An audiovisual clip as described herein can be but is not necessarily stored in an intermediate state as a separate audiovisual file before being concatenated with other audiovisual clips. As will be described below, in some examples, the system will select one video input from a number of available video inputs and use that video input to create an audiovisual clip that will later be saved in an audiovisual file. In some examples, the unused video inputs may be discarded.

Audiovisual clips can be concatenated. As used herein, "concatenated" means adding two audiovisual clips together sequentially in an audiovisual file. For example, two audiovisual clips that are each 30 seconds long can be combined to create a 60-second long audiovisual file. In this case, the audiovisual file would cut from the first audiovisual clip to the second audiovisual clip at the 30 second mark.

During use, each camera in the system records an unbroken sequence of video, and the microphone records an unbroken sequence of audio. An underlying time counter provides a timeline associated with the video and audio so that the video and audio can be synchronized.

In one example of the technology, the system samples the audio track to automatically find events that trigger the system to cut between video inputs when producing an audiovisual file. In one example, the system looks for segments in the audio track in which the volume is below a threshold volume. These will be referred to as low noise audio segments.

Figure 4:
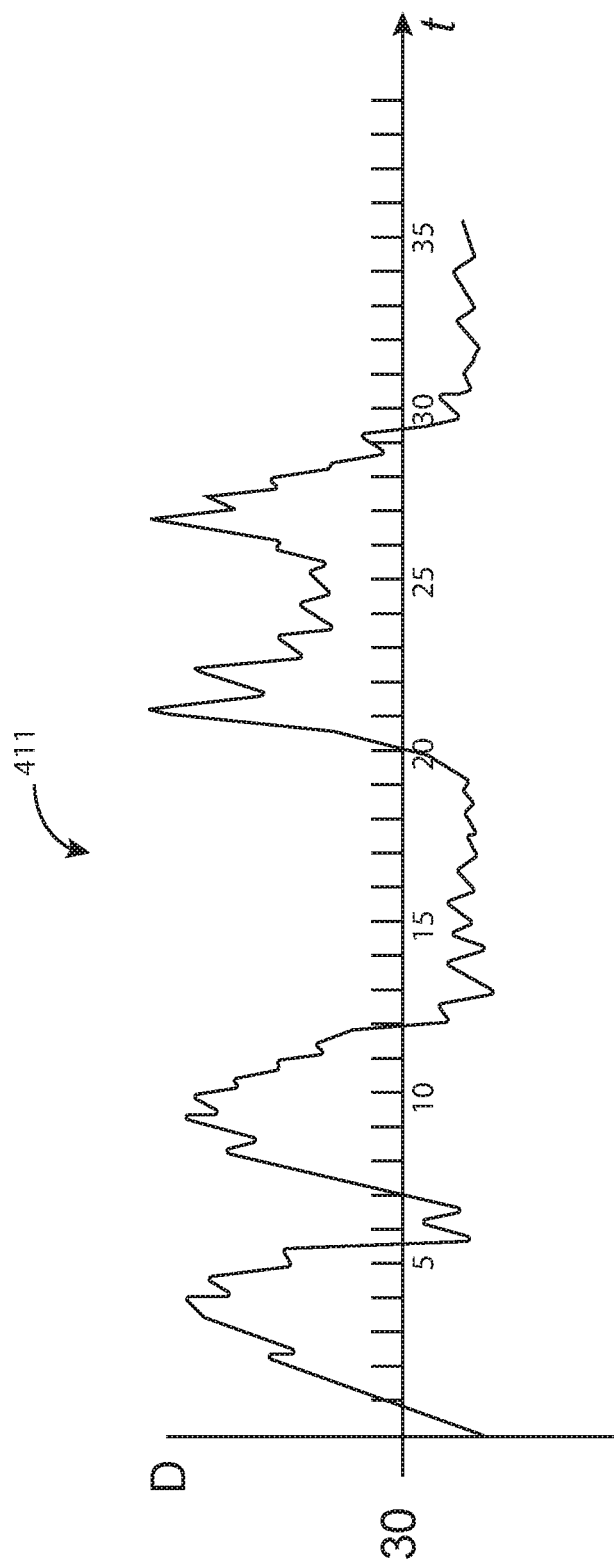
FIG. 4 is a graph of decibel level versus time for an audio input according to some examples.

FIG. 4 is a graph 411 representing the audio volume in an audio track over time. The graph conceptually shows the audio volume of the audio input in decibels (D) versus time in seconds (t). In some examples, the system uses a particular threshold volume as a trigger to determine when to cut between the video inputs. For example, in FIG. 4, the threshold level is 30 decibels. One method of finding low noise audio segments is to calculate an average decibel level over a particular range of time, such as 4 seconds. If the average decibel level during that period of time is below the threshold level, the system will mark this as a low noise audio segment.

Applying this method to FIG. 4, the system computes the average (mean) volume over each four-second interval for the entire length of the audio track, in this case, in the range between t=0 and t=35. Consider an average decibel level over a four second interval between t=5 and t=9. In this case, although the volume falls below 30 decibels for a short period of time, the average volume over that four second period is greater than 30 decibels, and therefore this would not be considered a low noise audio segment. Over the four second interval from t=11 to t=15 seconds, the average volume is less than 30 decibels, and therefore this would be considered a low noise audio segment. In some examples, as soon the system detects an event corresponding to a low noise audio segment, the system marks that time as being a trigger to switch between video inputs.

In some examples, the system marks the beginning and end of the low noise audio segments to find low noise audio segments of a particular length. In this example, the system computes the average (mean) volume over each four second interval, and as soon the average volume is below the threshold volume (in this case 30 decibels), the system marks that interval as corresponding to the beginning of the low noise audio segment. The system continues to sample the audio volume until the average audio volume is above the threshold volume. The system then marks that interval as corresponding to the end of the low noise audio segment.

The system uses the low noise audio segments to determine when to switch between camera angles. After finding and interval corresponding to the beginning or end of the low noise audio segments, the system determines precisely at which time to switch. This can be done in a number of ways, depending upon the desired result.

In the example of FIG. 4, the system could determine that the average volume of the four second interval between =10 and t=12 drops below the threshold volume. The system could use the end of that interval (t=12) to be the time to switch. Alternatively, the system could determine that the average volume of the four-second interval between t=18 and t=22 increases above the threshold volume, and determine that the beginning of that interval (t=18) as the time to switch. The system could also use the midpoint of the beginning and end of the intervals to switch (i.e., midway between t=12 and t=18). Other methods of determining precisely when in the timeline to make the switch are possible and are within the scope of the technology.

In some examples, the system is configured to discard portions of the video and audio inputs that correspond to a portion of the low noise audio segments. This eliminates dead air and makes the audiovisual file more interesting for the viewer. In some examples, the system only discards audio segments that our at least a predetermined length of time, such as at least 2 seconds, at least 4 seconds, at least 6 seconds, at least 8 seconds, or at least 10 seconds. This implementation will be discussed further in relation to FIG. 6.

Figure 5:
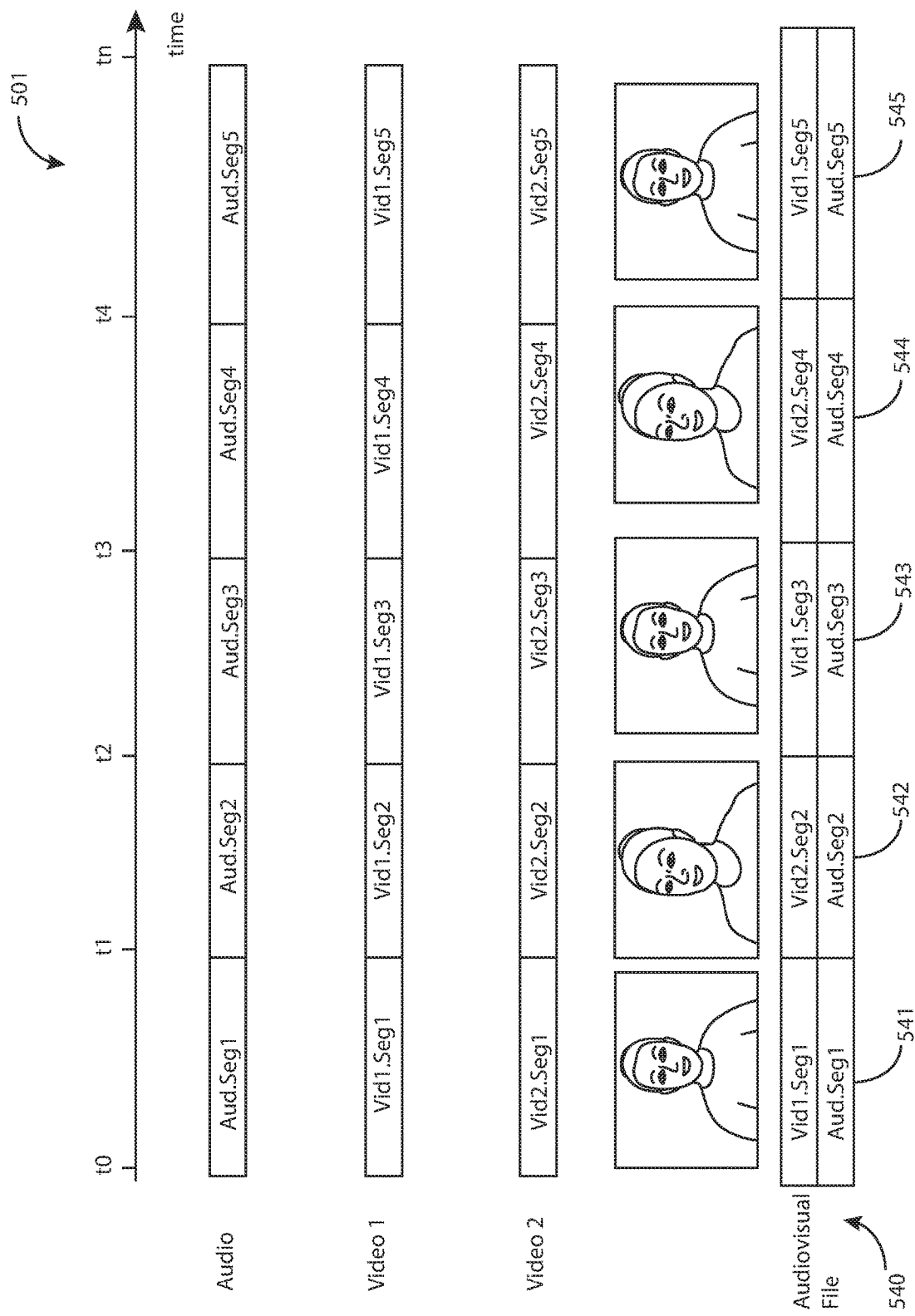
FIG. 5 visually illustrates a method of automatically concatenating audiovisual clips into an audiovisual file according to some examples.

Automatically Concatenating Audiovisual Clips
(FIG. 5)

FIG. 5 illustrates a system and method for automatically creating a combined audiovisual file containing video images from two or more video inputs. For the sake of simplicity, only two video inputs are illustrated in FIG. 5. It should be understood, however, that the method and system could be adapted to any number of video inputs.

The system includes two video inputs: Video 1 and Video 2. The system also includes an Audio input. In the example of FIG. 5, the video inputs and the audio input are recorded simultaneously. The two video inputs and the audio input are each recorded as an unbroken sequence. A time counter, such as the system clock 209, provides a timeline 501 that enables a time synchronization of the two video inputs and the audio input. The recording begins at time $t_0$ and ends at time $t_n$.

In the example of FIG. 5, the system samples the audio track to determine low noise audio segments. For example, the system can use the method as described in relation to FIG. 4; however, other methods of determining low noise audio segments are contemplated and are within the scope of the disclosed technology.

Sampling the audio track, the system determines that at time $t_1$, a low noise audio event occurred. The time segment between $t=t_0$ and $t=t_1$ is denoted as Seg1. To assemble a combined audiovisual file 540, the system selects an audiovisual clip 541 combining one video input from Seg1 synchronized with the audio from Seg1, and saves this audiovisual clip 541 as a first segment of the audiovisual file 540—in this case, Vid1.Seg1 (Video 1 Segment 1) and Aud.Seg1 (audio Segment 1). In some examples, the system can use a default video input as the initial input, such as using the front-facing camera as the first video input for the first audiovisual clip. In alternative examples, the system may sample content received while the video and audio are being recorded to prefer one video input over another input. For example, the system may use facial or gesture recognition to determine that one camera angle is preferable over another camera angle for that time segment. Various alternatives for choosing which video input to use first are possible and are within the scope of the technology.

The system continues sampling the audio track, and determines that at time $t_2$, a second low noise audio event occurred. The time segment between $t=t_1$ and $t=t_2$ is denoted as Seg2. For this second time segment, the system automatically switches to the video input from Video 2, and saves a second audiovisual clip 542 containing Vid2.Seg2 and Aud.Seg2. The system concatenates the second audiovisual clip 542 and the first audiovisual clip 541 in the audiovisual file 540.

The system continues sampling the audio track, and determines that at time $t_3$, a third low noise audio event occurred. The time segment between $t=t_2$ and $t=t_3$ is denoted as Seg3. For this third time segment, the system automatically cuts back to the video input from Video 1, and saves a third audiovisual clip 543 containing Vid1.Seg3 and Aud.Seg3. The system concatenates the second audiovisual clip 542 and the third audiovisual clip 543 in the audiovisual file 540.

The system continues sampling the audio track, and determines that at time $t_4$, a fourth low noise audio event occurred. The time segment between $t=t_3$ and $t=t_4$ is denoted as Seg4. For this fourth time segment, the system automatically cuts back to the video input from Video 2, and saves a fourth audiovisual clip 544 containing Vid2.Seg4 and Aud.Seg4. The system concatenates the third audiovisual clip 543 and the fourth audiovisual clip 544 in the audiovisual file 540.

The system continues sampling the audio track, and determines that no additional low noise audio events occur, and the video input and audio input stop recording at time $t_n$. The time segment between $t=t_4$ and $t=t_0$ is denoted as Seg5. For this fifth time segment, the system automatically cuts back to the video input from Video 1, and saves a fifth audiovisual clip 545 containing Vid1.Seg5 and Aud.Seg5. The system concatenates the fourth audiovisual clip 544 and the fifth audiovisual clip 545 in the audiovisual file 540.

In some examples, audio sampling and assembling of the combined audiovisual file is performed in real-time as the video interview is being recorded. In alternative examples, the video input and audio input can be recorded, stored in a memory, and processed later to create a combined audiovisual file. In some examples, after the audiovisual file is created, the raw data from the video inputs and audio input is discarded.

Figure 6:
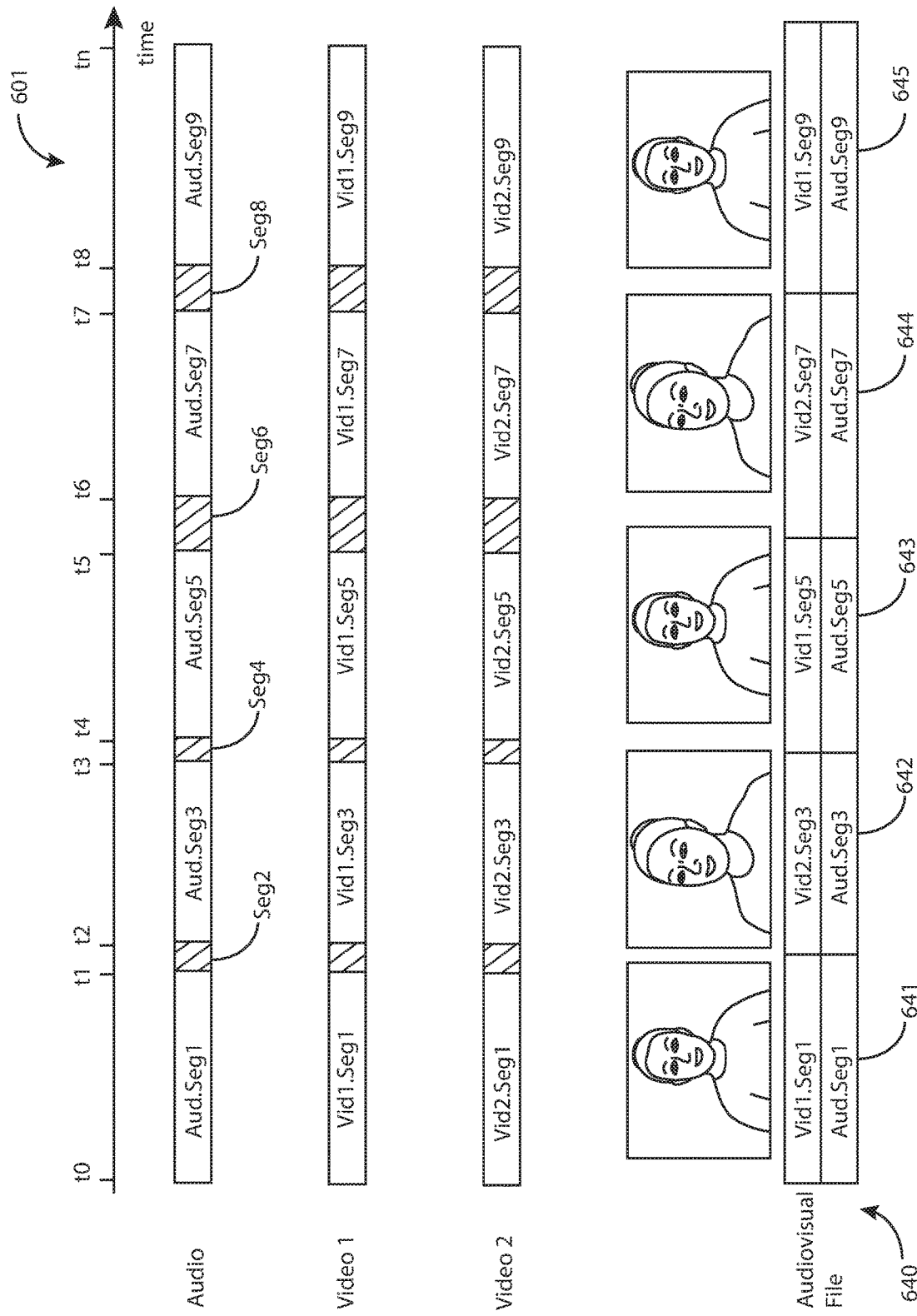
FIG. 6 visually illustrates a method of removing pauses from audio and video inputs and automatically concatenating audiovisual clips into an audiovisual file according to some examples.

Automatically Removing Pauses and Concatenating
Audiovisual Clips (FIG. 6)

In another aspect of the technology, the system can be configured to create combined audiovisual files that remove portions of the interview in which the subject is not speaking. FIG. 6 illustrates a system and method for automatically creating a combined audiovisual file containing video images from two or more video input, where a portion of the video input and audio input corresponding to low noise audio segments are not included in the combined audiovisual file. For the sake of simplicity, only two video inputs are illustrated in FIG. 6. It should be understood, however, that the method and system could be adapted to any number of video inputs.

In the example of FIG. 6, the system includes a video input Video 1 and Video number two. The system also includes an Audio input. The video inputs and the audio input are recorded simultaneously in an unbroken sequence. A time counter, such as the system clock 209, provides a timeline 601 that enables a time synchronization of the two video inputs and the audio input. The recording begins at time $t_0$ and ends at time $t_n$.

As in the example of FIG. 5, the system samples the audio track to determine low noise audio segments. In FIG. 6, the system looks for the beginning and end of low noise audio segments, as described above with relation to FIG. 4. Sampling the audio track, the system determines that at time $t_1$, a low noise audio segment begins, and at time $t_2$, the low noise audio segment ends. The time segment between $t=t_0$ and $t=t_1$ is denoted as Seg1. To assemble a combined audiovisual file 640, the system selects an audiovisual clip 641 combining one video input from Seg1 synchronized with the audio from Seg1, and saves this audiovisual clip 641 as a first segment of the audiovisual file 640—in this case, Vid1.Seg1 (Video 1 Segment 1) and Aud.Seg1 (audio Segment 1). The system then disregards the audio inputs and video inputs that occur during Seg2, the time segment between $t=t_1$ and $t=t_2$.

The system continues sampling the audio track, and determines that at time $t_3$, a second low noise audio segment begins, and at time $t_4$, the second low noise audio segment ends. The time segment between $t=t_2$ and $t=t_3$ is denoted as Seg3. For this time segment, the system automatically switches to the video input from Video 2, and saves a second audiovisual clip 642 containing Vid2.Seg3 and Aud.Seg3. The system concatenates the second audiovisual clip 642 and the first audiovisual clip 641 in the audiovisual file 640.

The system continues sampling the audio input to determine the beginning and end of further low noise audio segments. In the example of FIG. 6, Seg6 is a low noise audio segment beginning at time $t_5$ and ending at time $t_6$. Seg 8 is a low noise audio segment beginning at time $t_7$ and ending at time $t_8$. The system removes the portions of the audio input and video inputs that fall between the beginning and end of the low noise audio segments. At the same time, the system automatically concatenates retained audiovisual clips, switching between the video inputs after the end of each low noise audio segment. The system concatenates the audiovisual clips 643, 644, and 645 to complete the audiovisual file 640. The resulting audiovisual file 640 contains audio from segments 1, 3, 5, 7, and 9. The audiovisual file 640 does not contain audio from segments 2, 4, 6, or 8. The audiovisual file 640 contains alternating video clips from Video 1 and Video 2 that switch between the first video input and the second video input after each low noise audio segment.

Figure 7:
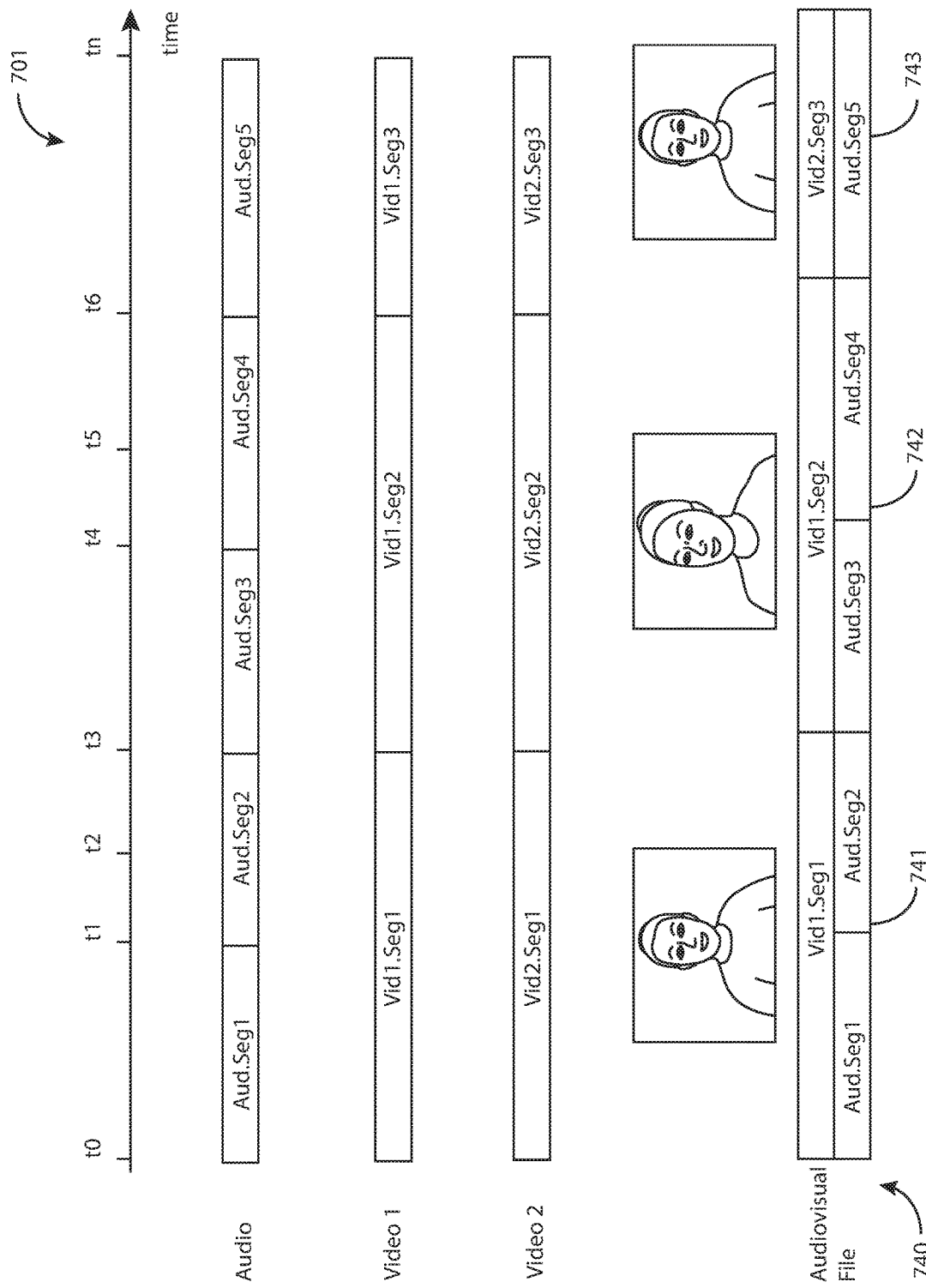
FIG. 7 visually illustrates a method of automatically concatenating audiovisual clips into an audiovisual file in response to an event according to some examples.

Automatically Concatenating Audiovisual Clips with Camera Switching in Response to Switch-Initiating Events (FIG. 7)

In another aspect of the technology, the system can be configured to switch between the different video inputs in response to events other than low noise audio segments. These events will be generally categorized as switch-initiating events. A switch-initiating event can be detected in the content of any of the data inputs that are associated with the timeline. "Content data" refers to any of the data collected during the video interview that can be correlated or associated with a specific time in the timeline. These events are triggers that the system uses to decide when to switch between the different video inputs. For example, behavioral data input, which can be received from an infrared sensor or present in the video or audio, can be associated with the timeline in a similar manner that the audio and video images are associated with the timeline. Facial recognition data, gesture recognition data, and posture recognition data can be monitored to look for switch-initiating events. For example, if the candidate turns away from one of the video cameras to face a different video camera, the system can detect that motion and note it as a switch-initiating event. Hand gestures or changes in posture can also be used to trigger the system to cut from one camera angle to a different camera angle.

As another example, the audio input can be analyzed using speech to text software, and the resulting text can be used to find keywords that trigger a switch. In this example, the words used by the candidate during the interview would be associated with a particular time in the timeline.

Another type of switch-initiating event can be the passage of a particular length of time. A timer can be set for a number of seconds that is the maximum desirable amount of time for a single segment of video. For example, an audiovisual file can feel stagnant and uninteresting if the same camera has been focusing on the subject for more than 90 seconds. The system clock can set a 90 second timer every time that a camera switch occurs. If it is been greater than 90 seconds since the most recent switch-initiating event, expiration of the 90 second timer can be used as the switch-initiating event. Other amounts of time could be used, such as 30 seconds, 45 seconds, 60 seconds, etc., depending on the desired results.

Conversely, the system clock can set a timer corresponding to a minimum number of seconds that must elapse before a switch between two video inputs. For example, the system could detect multiple switch-initiating events in rapid succession, and it may be undesirable to switch back-and-forth between two video inputs too quickly. To prevent this, the system clock could set a timer for 30 seconds, and only register switch-initiating events that occur after expiration of the 30 second timer. Though resulting combined audiovisual file would contain audiovisual clip segments of 30 seconds or longer.

Another type of switch-initiating event is a change between interview questions that the candidate is answering, or between other segments of a video recording session. In the context of an interview, the user interface API 235 (FIG. 2) can display interview questions so that the individual 112 can read each interview question and then respond to it verbally. The user interface API can receive input, such as on a touch screen or input button, to indicate that one question has been answered, and prompt the system to display the next question. The prompt to advance to the next question can be a switch-initiating event.

Turning to FIG. 7, the system includes two video inputs: Video 1 and Video 2. The system also includes an Audio input. In the example of FIG. 7, the video inputs and the audio input are recorded simultaneously. The two video inputs and the audio input are each recorded as an unbroken sequence. A time counter, such as the system clock 209, provides a timeline 701 that enables a time synchronization of the two video inputs and the audio input. The recording begins at time $t_0$ and ends at time $t_n$. In some examples, the system of FIG. 7 further includes behavioral data input associated with the timeline 701.

In the example of FIG. 7, the system automatically samples the audio input for low noise audio segments in addition to detecting switch-initiating events. The system can sample the audio input using the method as described in relation to FIG. 4; however, other methods of determining low noise audio segments are contemplated and are within the scope of the disclosed technology.

In FIG. 7, the audio track is sampled in a manner similar to that of FIG. 5. The system determines that at time $t_1$, a low noise audio event occurred. The time segment between $t=t_0$ and $t=t_1$ is denoted as Aud.Seg1. However, no switch-initiating event was detected during Aud.Seg1. Therefore, unlike the system of FIG. 5, the system does not switch video inputs.

At time $t_2$, the system detects a switch-initiating event. However, the system does not switch between camera angles at time $t_2$, because switch-initiating events can occur at any time, including during the middle of a sentence. Instead, the system in FIG. 7 continues sampling the audio input to find the next low noise audio event. This means that a switch between two camera angles is only performed after two conditions have been met: the system detects a switch-initiating event, and then, after the switch-initiating event, the system detects a low noise audio event.

In some examples, instead of continuously sampling the audio track for low noise audio events, the system could wait to detect a switch-initiating event, then begin sampling the audio input immediately after the switch-initiating event. The system would then cut from one video input to the other video input at the next low noise audio segment.

At time $t_3$, the system determines that another low noise audio segment has occurred. Because this low noise audio segment occurred after a switch-initiating event, the system begins assembling a combined audiovisual file 740 by using an audiovisual clip 741 combining one video input (in this case, Video 1) with synchronized audio input for the time segment $t=t_0$ through $t=t_3$.

The system then waits to detect another switch-initiating event. In the example of FIG. 7, the system finds another low noise audio event at $t_4$, but no switch-initiating event has yet occurred. Therefore, the system does not switch to the second video input. At time $t_5$, the system detects a switch-initiating event. The system then looks for the next low noise audio event, which occurs at time $t_6$. Because time $t_6$ is a low noise audio event that follows a switch-initiating event, the system takes the audiovisual clip 742 combining video input from Video 2 and audio input from the time segment from $t=t_3$ to $t=t_6$. The audiovisual clip 741 is concatenated with the audiovisual clip 742 in the audiovisual file 740.

The system then continues to wait for a switch-initiating event. In this case, no switch-initiating event occurs before the end of the video interview at time $t_n$. The audiovisual file 740 is completed by concatenating an alternating audiovisual clip 743 containing video input from Video 1 to the end of the audiovisual file 740.

The various methods described above can be combined in a number of different ways to create entertaining and visually interesting audiovisual interview files. Multiple video cameras can be used to capture a candidate from multiple camera angles. Camera switching between different camera angles can be performed automatically with or without removing audio and video corresponding to long pauses when the candidate is not speaking. Audio, video, and behavioral inputs can be analyzed to look for content data to use as switch-initiating events, and/or to decide which video input to use during a particular segment of the audiovisual file. Some element of biofeedback can be incorporated to favor one video camera input over the others.

Figure 8:
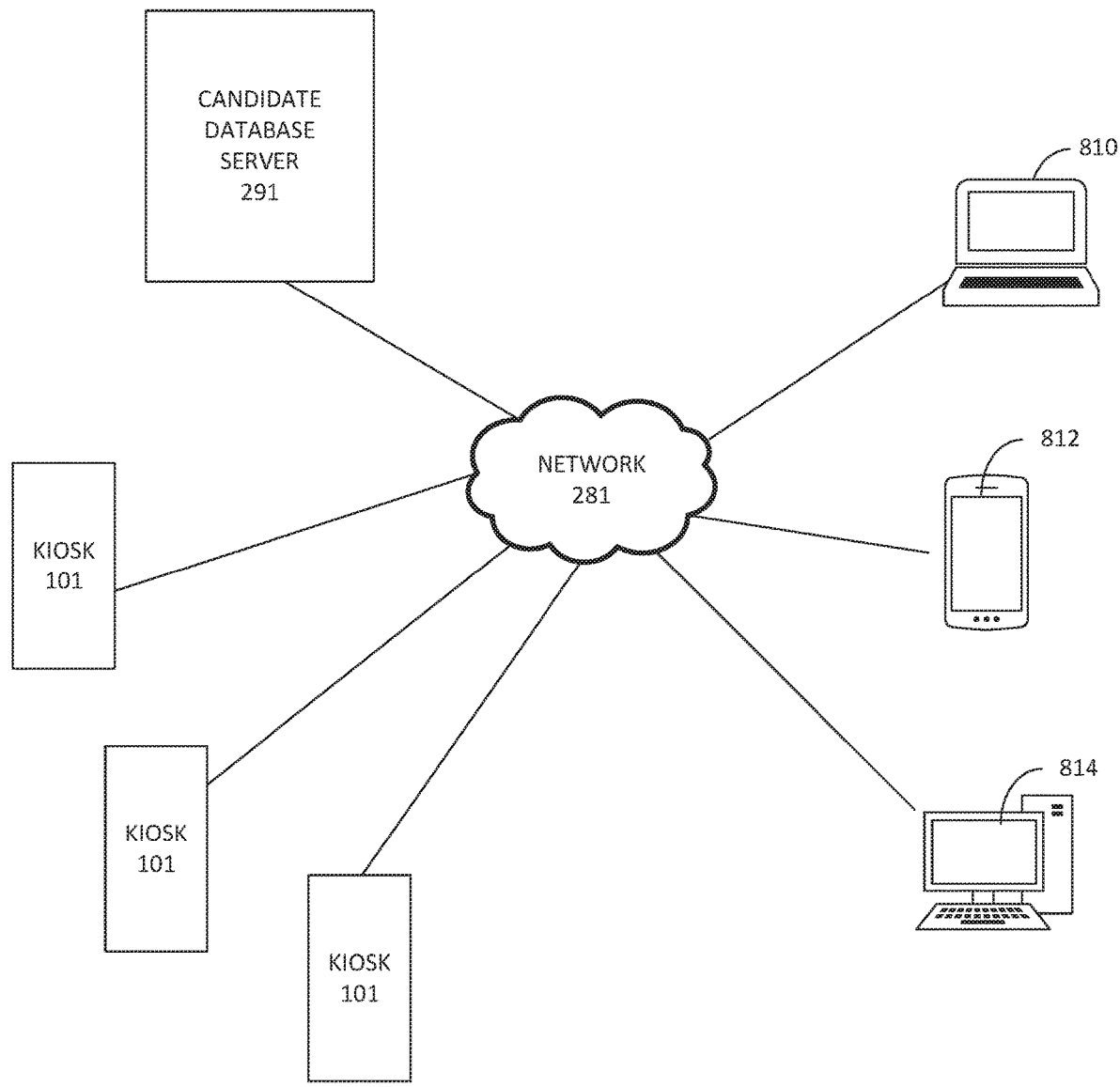
FIG. 8 is a schematic view of a system for a network of video interview kiosks according to some examples.

Networked Video Kiosk System (FIG. 8)

In a further aspect, the system provides a networked system for recording, storing, and presenting audiovisual interviews of multiple employment candidates at different geographic sites. As seen in FIG. 8, the system can use multiple kiosks 101 at separate geographic locations. Each kiosk 101 can be similar to kiosk 101 shown in FIG. 2, with multiple video cameras, a local edge server, etc. Each of the kiosks 101 can be in data communication with a candidate database server 291 via a communication network 281 such as the Internet. Audiovisual interviews that are captured at the kiosks 101 can be uploaded to the candidate database server 291 and stored in a memory for later retrieval. Users, such as recruiters or hiring managers, can request to view candidate profiles and video interviews over the network 281. The system can be accessed by multiple devices, such as laptop computer 810, smart phone or tablet 812, and personal computer 814.

In addition or in the alternative, any of the individual kiosks 101 in a networked system, such as shown in FIG. 8, can be replaced by alternate kiosk 1700 or alternate kiosk 1901, described herein with respect to FIGS. 17-19.

Figure 9:
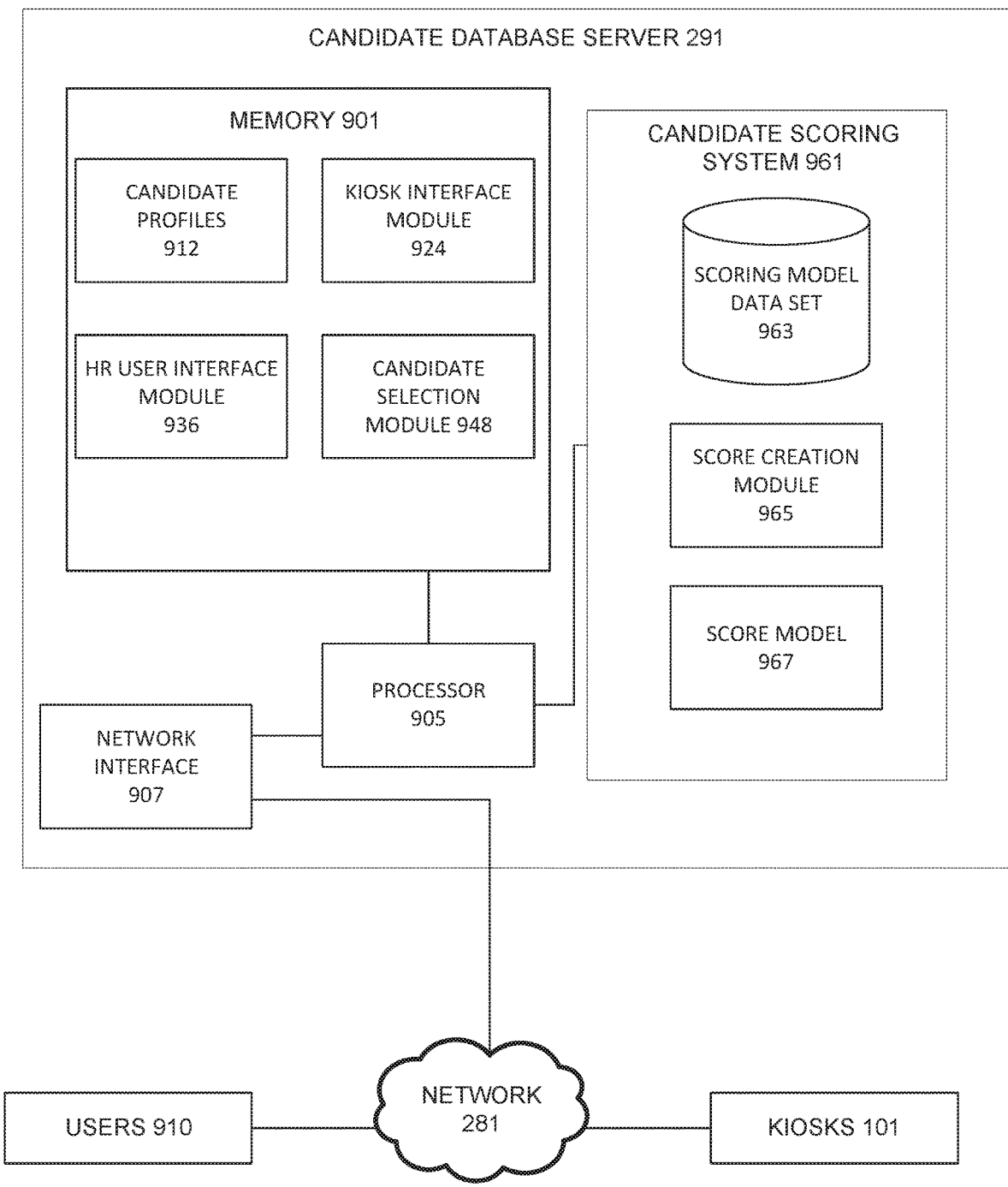
FIG. 9 is a schematic view of a candidate database server system according to some examples.
Figure 10:
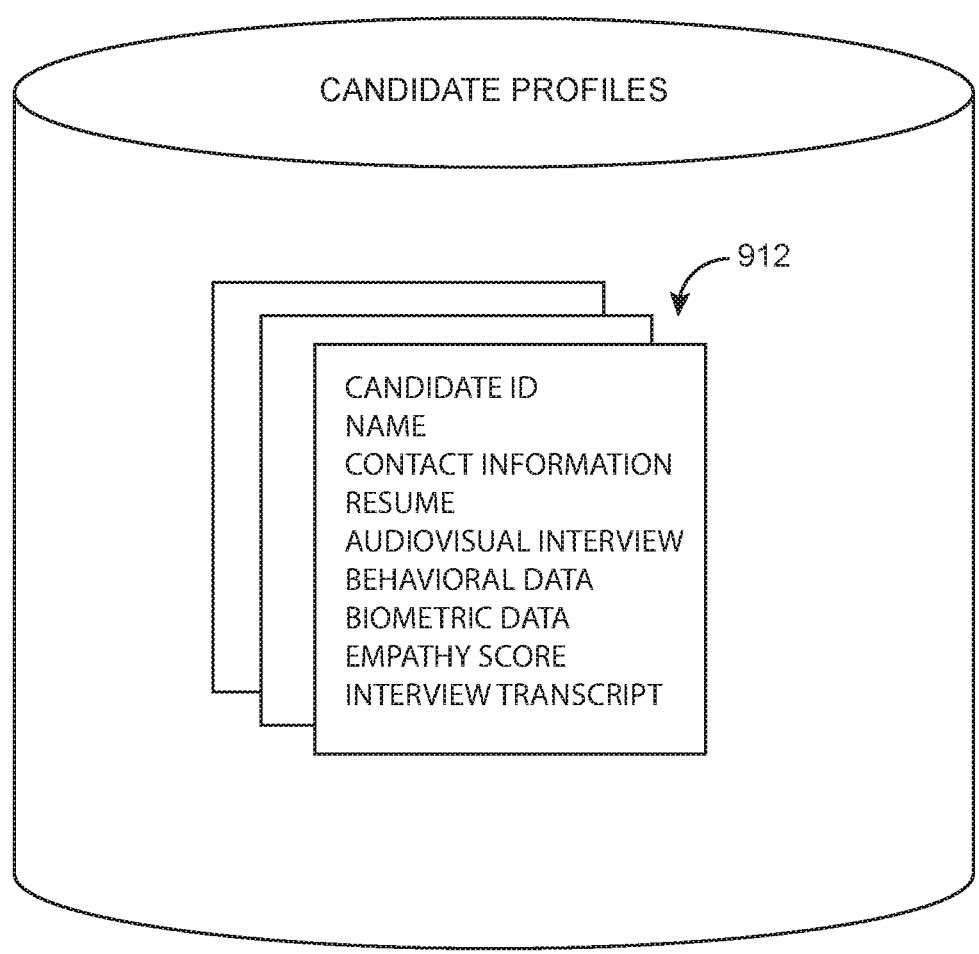
FIG. 10 is a schematic view of a candidate database according to some examples.

Candidate Database Server (FIGS. 9-10)

FIG. 9 is a schematic view of a candidate database server system according to some examples. Candidate database server 291 has a processor 905, a network communication interface 907, and a memory 901. The network communication interface 907 enables the candidate database server 291 to communicate via the network 281 with the multiple kiosks 101 and multiple users 910, such as hiring managers. The users 910 can communicate with the candidate database server 291 via devices such as the devices 810, 812, and 814 of FIG. 8.

The candidate database server 291 stores candidate profiles 912 for multiple employment candidates. FIG. 10 is a schematic view of candidate profiles 912. Each candidate in the system has a candidate profile. The candidate profiles 912 store data including but not limited to candidate ID, candidate name, contact information, resume text, audiovisual interview file, extracted behavioral data, which can include biometric data, a calculated empathy score, an interview transcript, and other similar information relevant to the candidate's employment search.

The memory 901 of the candidate database server 291 stores a number of software modules containing computer instructions for performing functions necessary to the system. A kiosk interface module 924 enables communication between the candidate database server 291 and each of the kiosks 101 via the network 281. A human resources (HR) user interface module 936 enables users 910 to view information for candidates with candidate profiles 912. As will be discussed further below, a candidate selection module 948 processes requests from users 910 and selects one or more particular candidate profiles to display to the user in response to the request.

In another aspect, the system further includes a candidate scoring system 961 that enables scoring of employment candidates based on information recorded during a candidate's video interview. As will be discussed further below, the scoring system 961 includes a scoring model data set 963 that is used as input data for creating the model. The data in the model data set 963 is fed into the score creation module 965, which processes the data to determine variables that correlate to a degree of empathy. The result is a score model 967, which is stored for later retrieval when scoring particular candidates.

Although FIG. 9 depicts the system with a single candidate database server 291, it should be understood that this is a representative example only. The various portions of the system could be stored in separate servers that are located remotely from each other. The data structures presented herein could furthermore be implemented in a number of different ways, and are not necessarily limited to the precise arrangement described herein.

Recording Audiovisual Interviews

In some examples, audiovisual interviews for many different job candidates can be recorded in a kiosk such as described above. To begin the interview, the candidate sits or stands in front of an array of video cameras and sensors. The height and position of each of the video cameras may be adjusted to optimally capture the video and the behavioral data input. In some examples, a user interface such as a tablet computer is situated in front of the candidate. The user interface can be used to present questions to the candidate.

In some examples, each candidate answers a specific number of predetermined questions related to the candidate's experience, interests, etc. These can include questions such as: Why did you choose to work in your healthcare role? What are three words that others would use to describe your work? How do you handle stressful work situations? What is your dream job? Tell us about a time you used a specific clinical skill in an urgent situation? Why are you a great candidate choice for a healthcare employer?

The candidate reads the question on the user interface, or an audio recording of the question can be played to the candidate. In response, the candidate provides a verbal answer as though the candidate were speaking in front of a live interviewer. As the candidate is speaking, the system is recording multiple video inputs, audio input, and behavioral data input. A system clock can provide a time synchronization for each of the inputs, allowing the system to precisely synchronize the multiple data streams. In some examples, the system creates a timestamp at the beginning and/or end of each interview question so that the system knows which question the individual was answering at a particular time. In some examples, the video and audio inputs are synchronized and combined to create audiovisual clips. In some examples, each interview question is saved as its own audiovisual file. So for example, an interview that posed five questions to the candidate would result in five audiovisual files being saved for the candidate, one audiovisual file corresponding to each question.

In some examples, body posture is measured at the same time that video and audio are being recorded while the interview is being conducted, and the position of the candidate's torso in three-dimensional space is determined. This is used as a gauge for confidence, energy, and self-esteem, depending on the question that the candidate is answering. One example of such a system is provided below.

Figure 11A:
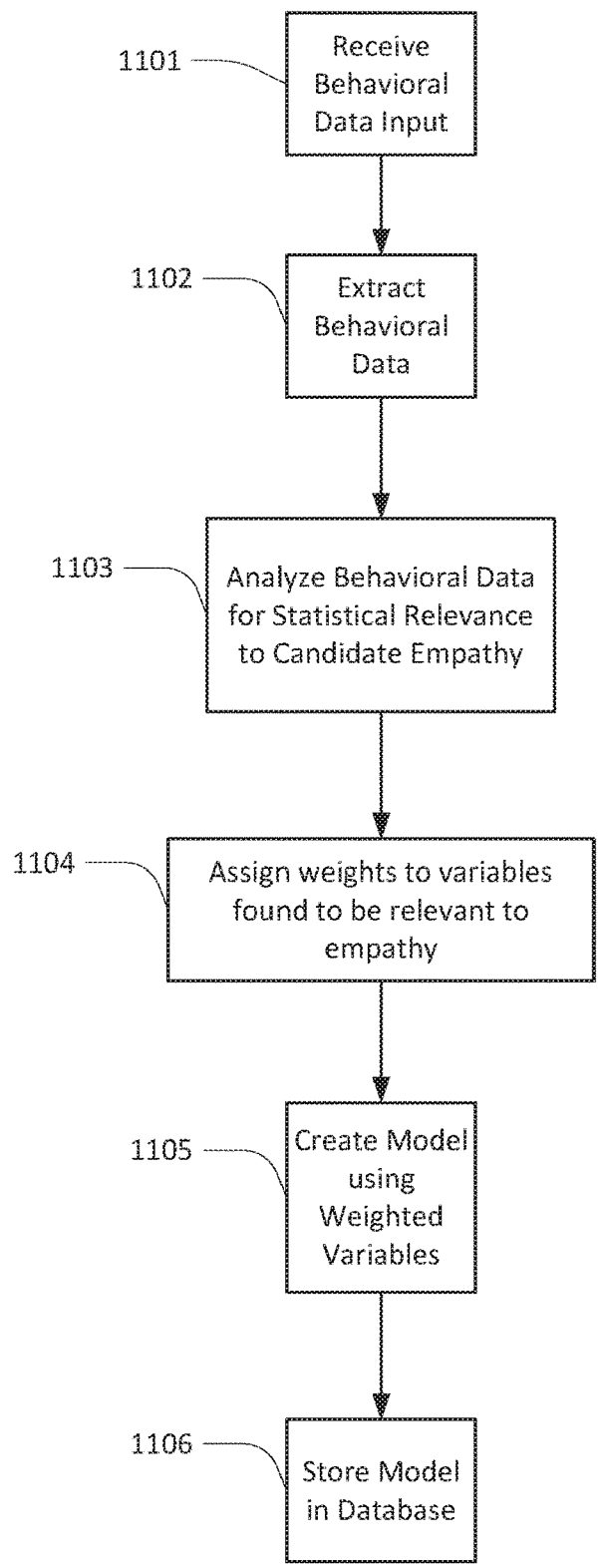
FIG. 11A is a flow chart for a method of building an empathy score model according to some examples.

Method of Building an Empathy Score Model
(FIG. 11A)

FIG. 11A illustrates one example of a method for building an empathy score model. The method can be performed in conjunction with technology described above related to a multi-camera kiosk setup capable of concatenating audiovisual files from multiple video inputs. However, other alternatives are possible and are within the scope of the employment candidate empathy scoring system described herein. The method can be performed in connection with recording an audiovisual interviews of multiple job candidates. The method receives a number of different types of data recorded during each interview. In some examples, individuals that are interviewed are chosen from among a pool of candidates having qualities that are known to be related to a particular degree of empathy. In some examples, the pool of candidates are known to have a high degree of empathy. In alternative examples, the pool of candidates is drawn from the general population, in which case it would be expected that the pool of candidates would have a wide range of degrees of empathy.

In some examples, empathy score models are created for different individual roles within a broader employment field. For example, an ideal candidate benchmark for a healthcare administrator could be very different from the benchmark for an employee that has direct hands-on contact with patients.

By taking the measurements of ideal candidates, we have a base line that can be utilized. We can then graph the changes and variations for new candidates by the specific interview questions we have chosen. By controlling for time and laying over the other candidates' data, a coefficient of variation can be created per question and overall. Depending on the requirements of the position we are trying to fill, we can select candidates who appear more competent in a given area, such as engagement, leadership or empathy.

Turning to FIG. 11A, in step 1101, behavioral data input for multiple individuals is received. In some examples, the behavioral data input is video data. In some examples, the behavioral data input is audio data. In some examples, the behavioral data input is sensor data, such as data output from an infrared sensor. In some examples, the behavioral data input is text data, such as resume text, written text input, or text extracted from recorded speech using text to speech software. The behavioral data input can be one type of data, or multiple different types of data can be used as behavioral data input.

Each individual within the pool of candidates provides behavioral data. In some examples, the pool of candidates is a predetermined size to effectively represent a general population, while remaining small enough to efficiently analyze the data. For example, the sample size of the pool of candidates can be at least 30 individuals, at least 100 individuals, at least 200 individuals, at least 300 individuals or at least 400 individuals. In some examples, the sample size of the pool candidates can be less than 500 individuals, less than 400 individuals, less than 300 individuals, less than 200 individuals, or less than 100 individuals. In some examples, the pool of candidates can be between about 30 and 500 individuals, between about 100 and 400 individuals, or between about 100 and 300 individuals. In some examples, the sample size of the pool of candidates can be approximately 300 individuals.

In step 1102, behavioral data is extracted from the behavioral data input. Extraction of the behavioral data is accomplished differently depending on which type of input is used (video, audio, sensor, etc.). In some examples, multiple variables are extracted from each individual type of behavioral data. For example, a single audio stream can be analyzed for multiple different types of characteristics, such as voice pitch, tone, cadence, the frequency with which certain words are used, length of time speaking, or the number of words per minute spoken by the individual. Alternatively or in addition, the behavioral data can be biometric data, including but not limited to facial expression data, body posture data, hand gesture data, or eye movement data. Other types of behavioral data are contemplated and are within the scope of the technology.

In step 1103, the behavioral data is analyzed for statistical relevance to an individual's degree of empathy. For example, regression analysis can be performed on pairs of variables or groups of variables to provide a trend on specific measures of interest. In some cases, particular variables are not statistically relevant to degree of empathy. In some cases, particular variables are highly correlated to a degree of empathy. After regression analysis, a subset of all of the analyzed variables are chosen as having statistical significance to a degree of empathy. In step 1104, each of the variables found to be relevant to the individual's degree of empathy is given a weight. The weighted variables are then added to an empathy score model in step 1105, and the empathy score model is stored in a database in step 1106, to be retrieved later when analyzing new candidates.

Figure 11B:
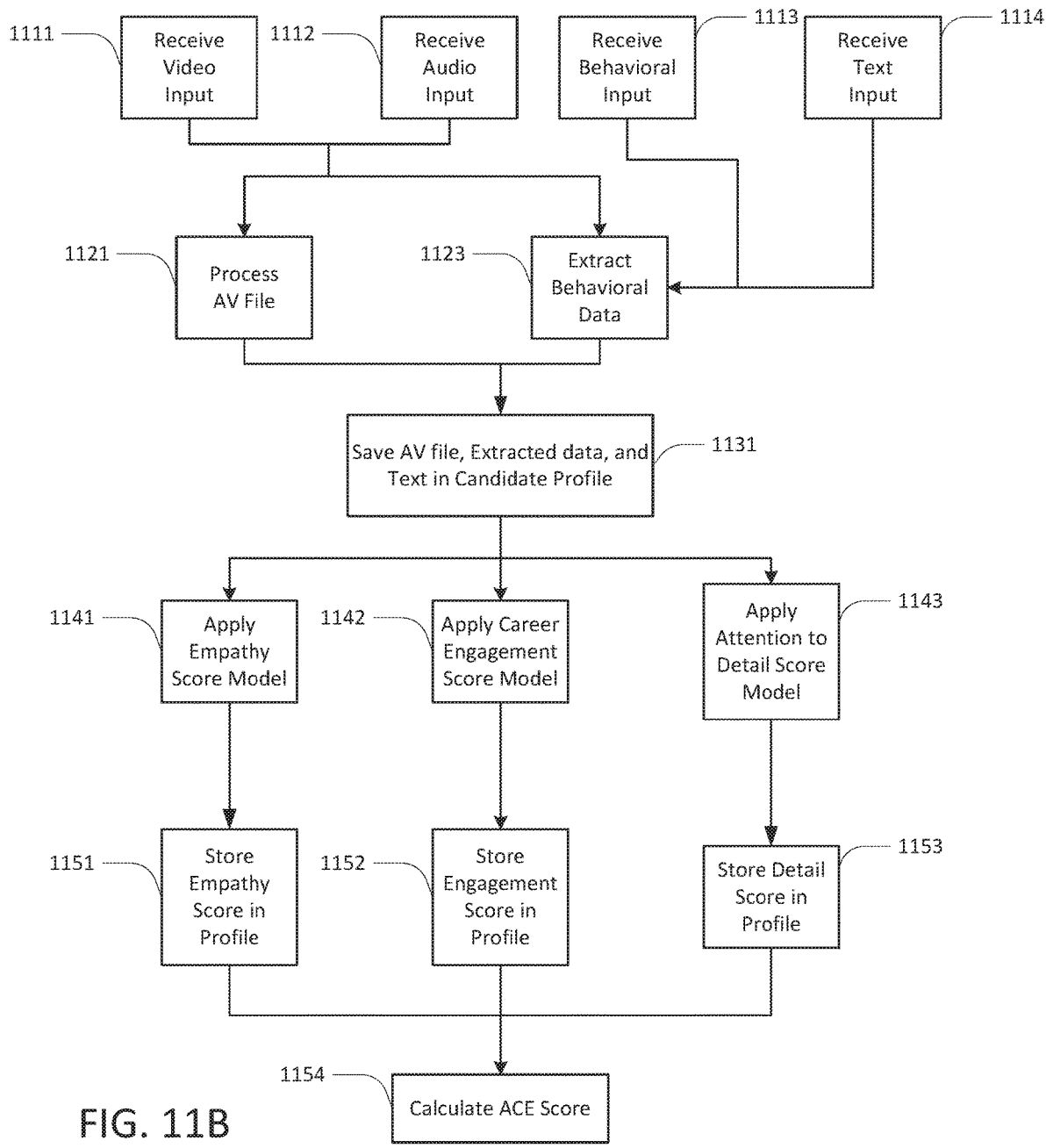
FIG. 11B is a flow chart for a method of applying an empathy score model according to some examples.

Method of Applying an Empathy Score Model (FIG. 11B)

Turning to FIG. 11B, in some examples, a method of applying an empathy score model is provided. The method can be performed in conjunction with technology described above related to a multi-camera kiosk set up capable of concatenating audiovisual files from multiple video inputs. Other alternatives are possible and are within the scope of the employment candidate empathy scoring system. In steps 1111-1114, a number of different types of data are received. In some examples, the data is recorded during video interviews of multiple job candidates. For each job candidate the system receives: video data input 1111, audio data input 1112, and behavioral data input 1113. Optionally, the system receives text data input 1114. In some examples, the video data input 1111, audio data input 1112, and behavioral data input 1113 is recorded simultaneously. In some examples, these data inputs are associated with a timestamp provided by a system clock that indicates a common timeline for each of the data inputs 1111-1113. In some examples, the data inputs that are received are of the same type that were determined to have statistical significance to a degree of empathy of a candidate in steps 1103-1104 of FIG. 11A.

In step 1121, the system takes the video data input 1111 and the audio data input 1112 and combines them to create an audiovisual file. In some examples, the video data input 1111 includes video data from multiple video cameras. In some examples, the video data input 1111 from multiple video cameras is concatenated to create an audiovisual interview file that cuts between video images from multiple cameras as described in relation to FIGS. 3-7. In some examples, the video data input 1111 and the audio data input 1112 is synchronized to create a single audiovisual file. In some examples, the video data input 1111 is received from a single video camera, and be audiovisual file comprises the video data from the single video camera and the audio data input 1112 that are combined to create a single audiovisual file.

In step 1123, behavioral data is extracted from the data inputs received in steps 1111-1114. The behavioral data is extracted in a manner appropriate to the particular type of data input received. For example, if the behavioral data is received from an infrared sensor, the pixels recorded by the infrared sensor are analyzed to extract data relevant to the candidate's behavior while the video interview was being recorded. One such example is provided below in relation to FIGS. 13-15, although other examples are possible and are within the scope of the technology.

In step 1131, the audiovisual file, the extracted behavioral data, and the text (if any) is saved in a profile for the candidate. In some examples, this data is saved in a candidate database as shown and described in relation to FIG. 9.

In step 1141, the information saved in the candidate profile in the candidate database is applied to the empathy score model. Application of the empathy score model results in an empathy score for the candidate based on the information received in steps 1111-1114. In step 1151, the empathy score is then saved in the candidate profile of that particular individual.

Optionally, a career engagement score is applied in step 1142. The career engagement score is based on a career engagement score model that measures the candidate's commitment to advancement in a career. In some examples, the career engagement score receives text from the candidate's resume received in step 1114. In some examples, the career engagement score receives text extracted from an audio input by speech to text software. The career engagement score model can be based, for example, in the number of years that the candidate has been in a particular industry, or the number of years that the candidate has been in a particular job. In some examples, keywords extracted from the audio interview of the candidate can be used in the career engagement score. In examples in which the candidate receives a career engagement score, the career engagement score is stored in the candidate profile in step 1152.

In some examples, the system provides the candidate with an attention to detail score in step 1143. The attention to detail score can be based, for example, on text received from the text data input step 1114. The input to the attention to detail score model can be information based on a questionnaire received from the candidate. For example, the candidate's attention to detail can be quantitatively measured based on the percentage of form fields that are filled out by the candidate in a pre-interview questionnaire. The attention to detail score can also be quantitatively measured based on the detail provided in the candidate's resume. Alternatively or in addition, the attention to detail score can be related to keywords extracted from the audio portion of a candidate interview using speech to text. In step 1153, the attention to detail score is stored in the candidate's profile.

Optionally, the candidate's empathy score, career engagement score, and attention to detail score can be weighted to create a combined score incorporating all three scores at step 1154. This can be referred to as an "ACE" score (Attention to detail, Career engagement, Empathy). In some examples, each of the three scores stored in steps 1151-1153 are stored individually in a candidate's profile. These three scores can each be used to assess a candidate's appropriateness for a particular position. In some examples, different employment openings weight the three scores differently.

Figure 12:
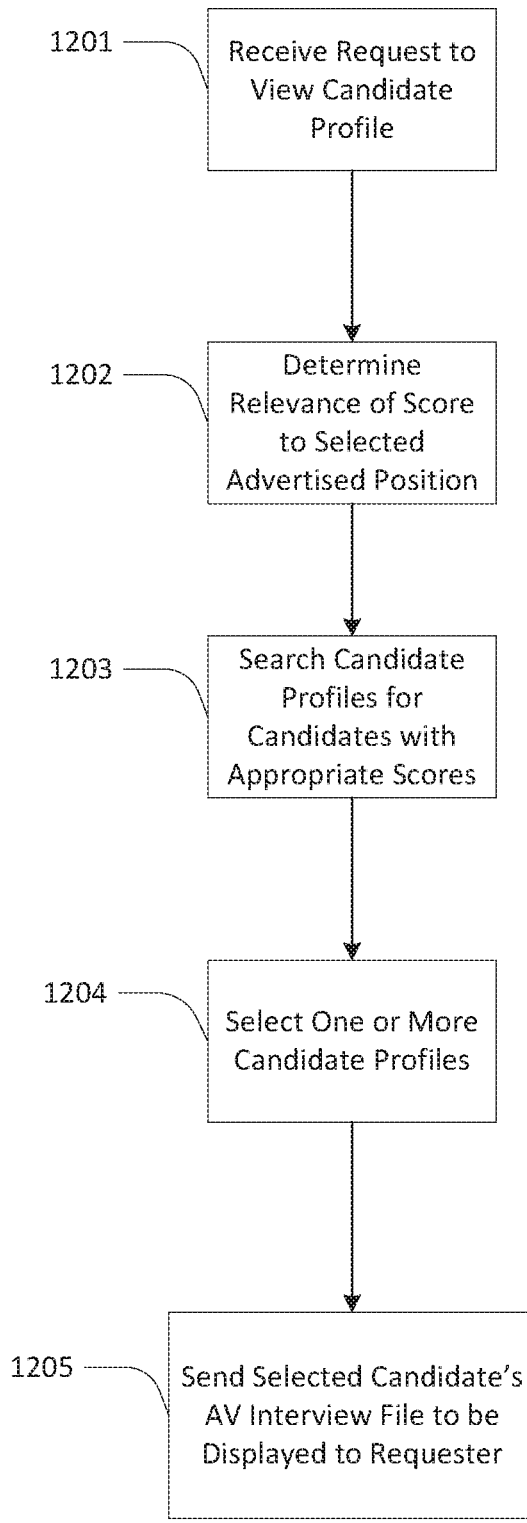
FIG. 12 is a flow chart of a method for selecting an interview file to be displayed according to some examples.

Method of Selecting a Candidate Profile in Response to a Request (FIG. 12) FIG. 12 shows a method for using scored candidate profiles within a candidate database to select particular candidates to show to a user in response to a query to view candidate profiles. In a system that manages hundreds if not thousands of candidate profiles for different employment candidates, selecting one or more candidate video interviews to display to a hiring manager is time consuming and labor intensive if done manually. Furthermore, in some instances only a portion of a video interview is desired to be shown to a hiring manager. Automating the process of selecting which candidates to display to the hiring manager, and which particular video for each candidate should be displayed, improves the efficiency of the system and speeds up the cycle of recording the video interviews, showing the video interviews to the hiring manager, and ultimately placing the employment candidate in a job.

The method of FIG. 12 can be used in conjunction with the methods described in relation to the FIGS. 11A-11B. In step 1201, a request is received over a network from a user such as a human resources manager. The network can be similar to that described in relation to FIG. 8. The user can query the system via a number of user devices, including devices 810-814. However, the technology should not be interpreted as being limited to the system shown in FIG. 8. Other system configurations are possible and are within the scope of the present technology.

The request received in step 1201 can include a request to view candidates that conform to a particular desired candidate score as determined in steps 1151-1153. In step 1202, a determination is made of the importance of an empathy score to the particular request received in step 1201. For example, if the employment opening for which a human resources manager desires to view candidate profiles is related to employment in an emergency room or a hospice setting, it may be desired to select candidates with empathy scores in a certain range. In some examples, the request received in step 1201 indicates a request that includes a desired range of empathy scores. In some example, the desired range of empathy scores is within the highest 50% of candidates. In some example, the desired range of empathy scores is within the highest 25% of candidates. In some examples, the desired range of empathy scores is when in the highest 15% of candidates or 10% candidates.

Alternatively, in some examples, the request received in step 1201 includes a request to view candidates for employment openings that do not require a particular degree of empathy. This would include jobs in which the employee does not interact with patients. Optionally, for candidates who do not score within the highest percentage of candidates in the group, these candidates can be targeted for educational programs that will increase these candidates' empathy levels.

In step 1203, candidates that fall within the desired range of empathy scores are selected as being appropriate to being sent to the user in response to the request. This determination is made at least part on the empathy score of the particular candidates. In some examples, the system automatically selects at least 1 candidate in response to the request. In some examples, the system includes a maximum limit of candidates to be sent in response to request. In some examples, the system automatically selects a minimum number of candidates in response to the request. In some examples, the system automatically selects a minimum of 1 candidate. In some examples, the system automatically selects a maximum of 20 or fewer candidates. In some examples, the system automatically selects between 1 and 20 candidates, between 1 and 10 candidates, between 5 and 10 candidates, between 5 and 20 candidates, or other ranges between 1 and 20 candidates.

In some examples, the system determines an order in which the candidates are presented. In some examples, the candidates are presented in order of empathy scores highest to lowest. In alternative examples, candidates are presented based on ACE scores. In some examples, these candidates are presented in the rank from highest to lowest. In some examples, the candidates could first be selected based on a range of empathy scores, and then the candidates that fall within the range of empathy scores could be displayed in a random order, or in order from highest to lowest based on the candidate's ACE score.

In step 1205, in response to the request at 1201, and based on the steps performed in 1202-1204, the system automatically sends one or more audiovisual files to be displayed at the user's device. The audiovisual files correspond to candidate profiles from candidates whose empathy scores fall within a desired range. In some examples, the system sends only a portion of a selected candidate's audiovisual interview file to be displayed to the user.

In some examples, each candidate has more than one audiovisual interview files in the candidate profile. In this case, in some examples the system automatically selects one of the audiovisual interview files for the candidate. For example, if the candidate performed one video interview that was later segmented into multiple audiovisual interview files such that each audiovisual file contains an answer to a single question, the system can select a particular answer that is relevant to the request from the hiring manager, and send the audiovisual file corresponding to that portion of the audiovisual interview. In some examples, behavioral data recorded while the candidate was answering a particular question is used to select the audiovisual file to send to the hiring manager. For example, the system can select a particular question answered by the candidate in which the candidate expressed the greatest amount of empathy. In other examples, the system can select the particular question based on particular behaviors identified using the behavioral data, such as selecting the question based on whether the candidate was sitting upright, or ruling out the audiovisual files in which the candidate was slouching or fidgeting.

Figure 13:
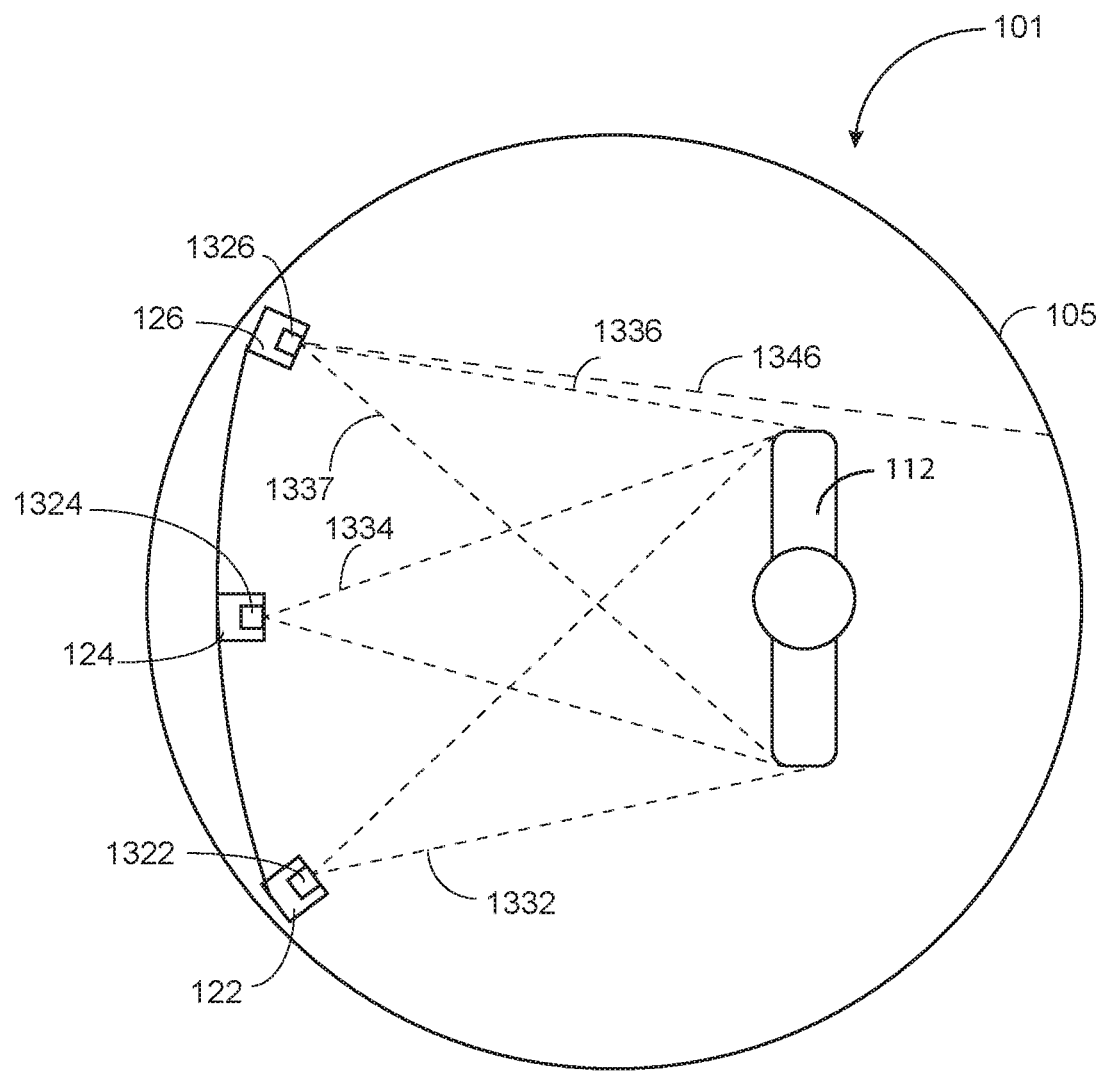
FIG. 13 is a schematic illustrating one example of a system for recording behavioral data input.

System and Method for Recording Behavioral Data Input (FIG. 13)

A system for recording behavioral data input, extracting behavioral data from the behavioral data input, and using the extracted behavioral data to determine an empathy score for candidate is presented in relation to FIGS. 13-15. The system uses data related to the candidate's body and torso movement to infer the candidate's level of empathy. Although one particular implementation of the system is described here, other implementations are possible and are within the scope of the disclosed technology.

FIG. 13 shows a method and system for recording behavioral data input. For ease of illustration, FIG. 13 shows the kiosk 101 from FIG. 1. It should be understood that other system set ups can be used to provide the same function, and the scope of the disclosed technology is not limited to this kiosk system. The system of FIG. 13 includes an enclosed booth 105, and houses multiple cameras 122, 124, 126 for recording video images of a candidate 112. As previously stated, each of the multiple cameras 122, 124, 126 can include a sensor for capturing video images, as well as an infrared depth sensor 1322, 1324, 1326 respectively, capable of sensing depth and movement of the individual.

In some examples, each of the cameras 122, 124, 126 is placed approximately one meter away from the candidate 112. In some examples, the sensor 1324 is a front-facing camera, and the two side sensors 1322 and 1326 are placed at an angle in relation to the sensor 1324. The angle can vary depending on the geometry needed to accurately measure the body posture of the candidate 112 during the video interview. In some examples, the sensors 1322, 1324, 1326 are placed at a known uniform height, forming a horizontal line that is parallel to the floor.

In some examples, the two side sensors 1322 and 1326 are angled approximately 45 degrees or less in relation to the front-facing sensor 1324. In some examples, the two side sensors 1322 and 1326 are angled 90 degrees or less in relation to the front-facing sensor 1324. In some examples, the two side sensors 1322 and 1326 are angled at least 20 degrees in relation to the front-facing sensor 1324. In some examples, the sensor 1322 can have a different angle with respect to the front-facing sensor 1324 than the sensor 1326. For example, the sensor 1322 could have an angle of approximately 45 degrees in relation to the front-facing sensor 1324, and the sensor 1326 could have an angle of approximately 20 degrees in relation to the front-facing sensor 1324.

In FIG. 13, dashed lines schematically represent the infrared sensors detecting the location of the candidate 112 within the space of the kiosk 101. The depth sensor emits infrared light and detects infrared light that is reflected. In some examples, the depth sensor captures an image that is 1,024 pixels wide and 1,024 pixels high. Each pixel detected by the depth sensor has an X, Y, and Z coordinate, but the pixel output is actually on a projection pane represented as a point (X, Y, 1). The value for Z (the depth, or distance from the sensor to the object reflecting light) can be calculated or mapped.

Figure 14A:
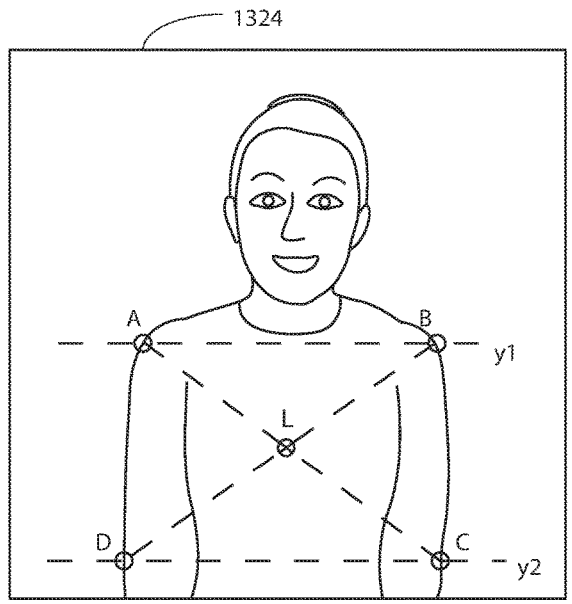
FIG. 14A shows a first image of a candidate being recorded by the sensors in FIG. 13.
Figure 14B:
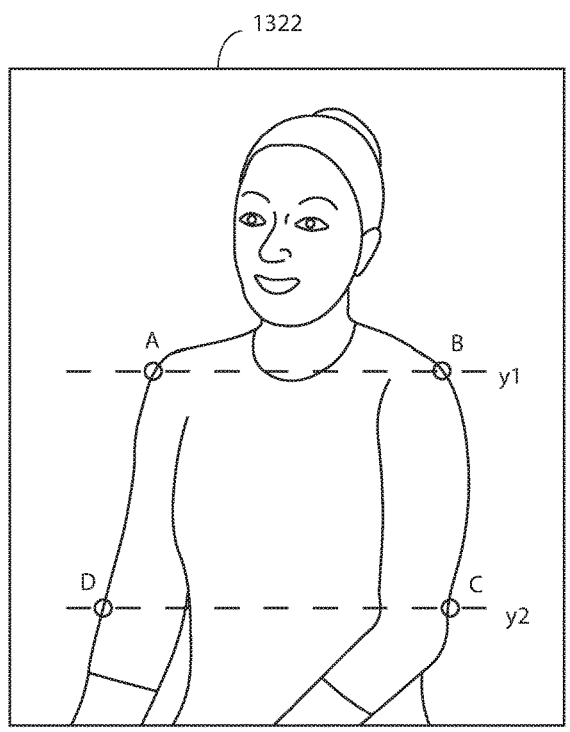
FIG. 14B shows a second image of a candidate being recorded by the sensors in FIG. 13.
Figure 14C:
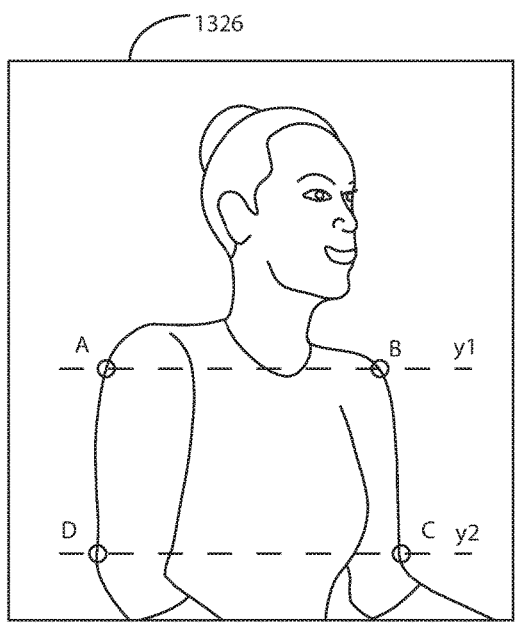
FIG. 14C shows a third image of a candidate being recorded by the sensors in FIG. 13.

FIGS. 14A-14C show three images of a candidate 112 being recorded by the sensors in FIG. 13. It should be noted that the depth sensors would not pick up the amount of detail depicted in these figures, and these drawings are presented for ease of understanding. FIGS. 14A-C represent 1,024 by 1,024 pixel images detected by the depth sensor. With frame rates of 30 to 90 frames per second, the range of possible data points if each pixel were to be analyzed is between 217,000 and 1 million pixels. Instead of looking at every one of these pixels, the system instead selectively looks for the edge of the candidate's torso at four different points: the right shoulder (point A), the left shoulder (point B), the left waistline (point C), and the right waistline (point D). The infrared pixel data received by each sensor represents a grid of pixels each having an X value and a Y value. The system selects two Y values, $y_1$ and $y_2$, and looks only at pixels along those two horizontal lines. Therefore, the system only needs to take as input the pixels at points $(x_n, y_1)$ and $(x_n, y_2)$, where $x_n$ represents the values between x=1 and x=1,024.

Additionally, to limit the amount of pixel data that the system must analyze, the system does not search for these points in every frame captured by the sensors. Instead, because the individual's torso cannot move at a very high speed, it is sufficient to sample only a few frames per second. For example, the system could sample 5 frames per second, or as few as 2 frames per second, and discard the rest of the pixel data from the other frames.

Example of Determining Points A, B, C, and D

In FIG. 13, the sensor 1326 emits infrared light in a known pattern. The infrared light is reflected back after it hits an object. This reflected light is detected by the sensor 1326 and is saved as a grid of pixels. In FIG. 13, infrared light emitted from sensor 1326 along the line 1336 hits the edge of the candidate 112's shoulder and is reflected back. Infrared light emitted from sensor 1326 along the line 1346 hits the back wall of the kiosk 101 and is reflected back. The light that traverses the lines 1336 and 1346 are saved as separate pixels. The pixels have X values and Y values. The system can calculate the Z values corresponding to the distance of the object from the sensor. In this example, the system determines that the Z value for the pixel projected along line 1336 is significantly smaller than the Z value for the pixel projection along line 1346. The system then infers that this point marks the edge of the individual's torso. In FIG. 14C, the system designates this point as point A on the individual's right shoulder. The system samples additional pixels along the line $Y=y_1$, and similarly determines that the pixel projected along line 1337 marks the other edge of the individual's torso. The system designates this point as point B on the individual's left shoulder.

The system then repeats this process for the line of pixels at $Y=y_2$ in a similar manner. The system marks the edge of the individual's torso on the left and right sides as points C and D respectively. The system performs similar operations for each of the sensors 1322 and 1324, and finds values for points A, B, C, and D for each of those frames.

Figure 15A:
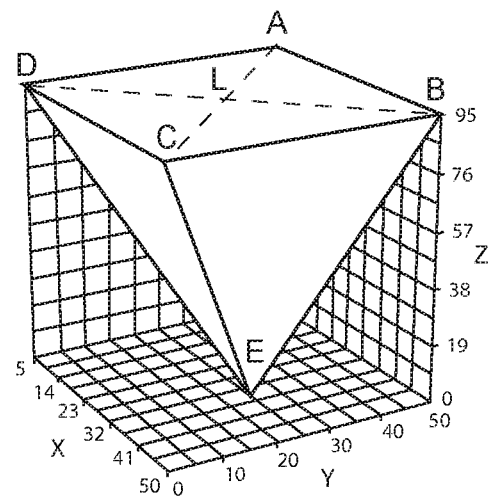
FIG. 15A represents the output of a calculation described in relation to FIG. 14A.
Figure 15B:
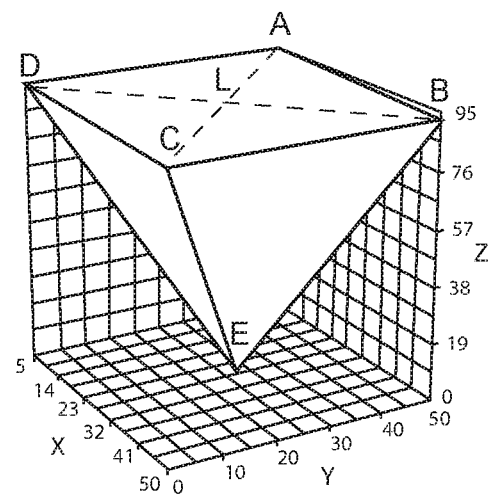
FIG. 15B represents the output of a calculation described in relation to FIG. 14B.
Figure 15C:
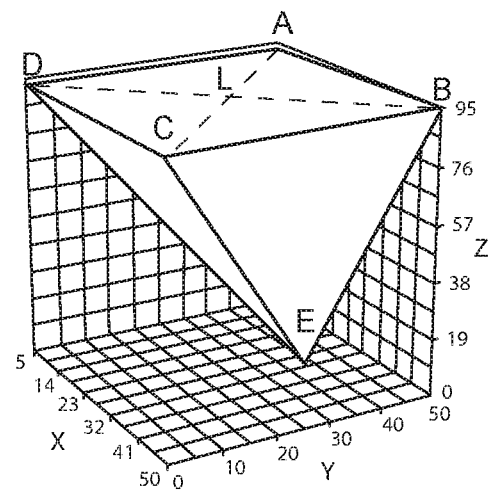
FIG. 15C represents the output of a calculation described in relation to FIG. 14C.

The system designates the location of the camera as point E. Points A, B, C, D, and E can be visualized as a pyramid having a parallelogram shaped base ABCD and an apex at point E, as seen in FIGS. 15A-C. FIG. 15A represents the output of the calculation in FIG. 14A, FIG. 15B represents the output of the calculation in FIG. 14B, and FIG. 15C represents the output of the calculation in FIG. 14C. Point L is designated as the intersection between lines AC and BD. The length of line EL represents approximately the distance of the center of the individual's torso to the sensor.

The system stores at least the following data, which will be referred to here as "posture volumes data": the time stamp at which the frame was recorded; the coordinates of points A, B, C, D, E, and L; the volume of the pyramid ABCDE; and the length of line EL. In practice, simple loops can be programmed to make these calculations on-the-fly. Because the sensor data being analyzed by the system is a very small subset of all of the available sensor data, the system is capable of performing this analysis in real time while the individual is being recorded with audio and video.

A further advantage is that the sensor data, being recorded simultaneously with the audio and video of the candidate's interview, can be time synchronized with the content of the audio and video. This allows the system to track precisely what the individual's torso movements were during any particular point of time in the audiovisual file. As will be shown in relation to FIGS. 16A-B, the posture volumes data can be represented as a graph with time on one axis and the posture volumes data on a second axis. A person viewing the graph can visually analyze the changes in the individual's torso, and jump immediately to the audio and video of that portion of the interview.

Figure 16A:
FIG. 16A shows a first example of a graph that can be created from behavioral data gathered during a candidate video interview.
Figure 16B:
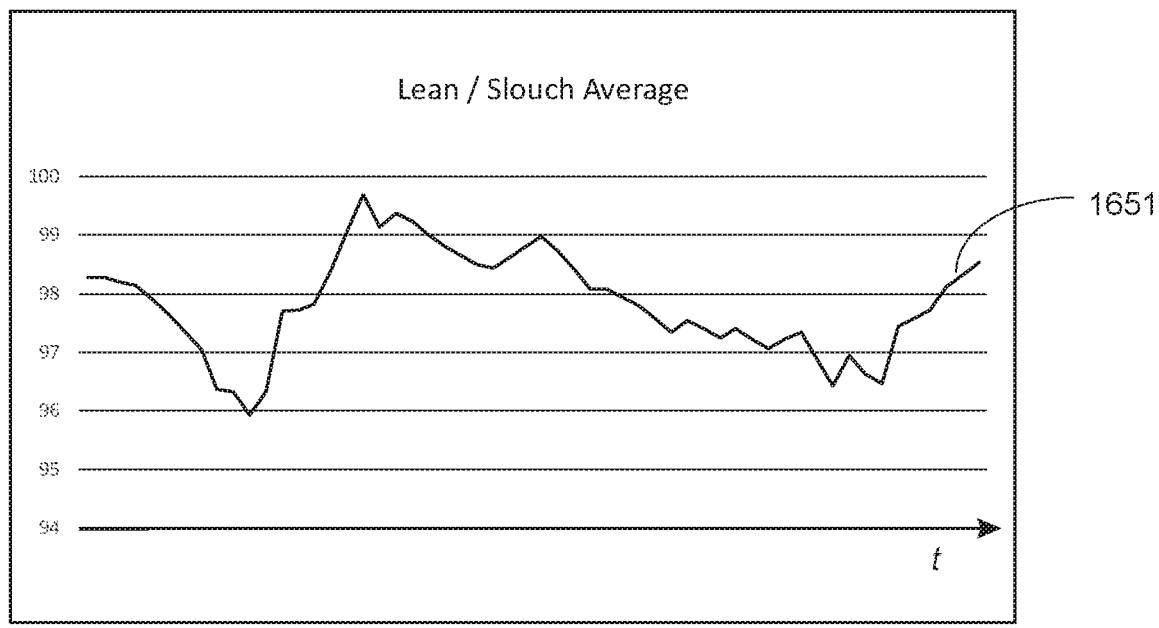
FIG. 16B shows a second example of a graph that can be created from behavioral data gathered during a candidate video interview.

Graphing Extracted Behavioral Data (FIGS. 16A-B)

Some movements by the candidate can correspond to whether a candidate is comfortable or uncomfortable during the interview. Some movements indicate engagement with what the candidate is saying, while other movements can reflect that a candidate is being insincere or rehearsed. These types of motions include leaning into the camera or leaning away from the camera; moving slowly and deliberately or moving with random movements; or having a lower or higher frequency of body movement. The candidate's use of hand gestures can also convey information about the candidate's comfort level and sincerity. The system can use the movement data from a single candidate over the course of an interview to analyze which question during the interview the candidate is most comfortable answering. The system can use that information to draw valuable insights about the candidate. For example, if the movement data indicates that the candidate is most comfortable during a question about their background, the system may deduce that the candidate is likely a good communicator. If the movement data indicates that the candidate is most comfortable during a question about their advanced skills or how to provide care in a particular situation, the system may deduce that the candidate is likely a highly-skilled candidate.

In one aspect, the system can generate a graph showing the candidate's movements over the course of the interview. One axis of the graph can be labeled with the different question numbers, question text, or a summary of the question. The other axis of the graph can be labeled with an indicator of the candidate's movement, such as leaning in versus leaning out, frequency of movement, size of movement, or a combination of these.

In one aspect, in addition or alternatively, the system can select which portion of the candidate interview to show to a user based on the movement data. The portion of the interview that best highlights the candidate's strengths can be selected. In addition or alternatively, a user can use a graph of movement of a particular candidate to decide which parts of an interview to view. The user can decide which parts of the interview to watch based on the movement data graphed by question. For example, the user might choose to watch the part of the video where the candidate showed the most movement or the least movement. Hiring managers often need to review large quantities of candidate information. Such as system allows a user to fast forward to the parts of a candidate video that the user finds most insightful, thereby saving time.

Users can access one particular piece of data based on information known about another piece of data. For example, the system is capable of producing different graphs of the individual's torso movement over time. By viewing these graphs, one can identify particular times at which the individual was moving a lot, or not moving. A user can then request to view the audiovisual file for that particular moment.

FIGS. 16A and 16B show two examples of graphs that can be created from behavioral data gathered during the candidate video interview. A human viewer can quickly view these graphs to determine when the candidate was comfortable during a question, or when the candidate was fidgeting. With this tool, a hiring manager can look at the graph before viewing the video interview and select a particular time in the timeline that the hiring manager is interested in seeing. This allows the hiring manager to efficiently pick and choose which portions of the video interviews to watch, saving time and energy.

FIG. 16A shows an example of a graph of data from among the posture volume data described above. In particular, FIG. 16A graphs the volume of the pyramid ABCDE from FIGS. 15A-C as the volume changes over time. The line 1622 represents volume data collected from sensor 1322 versus time, the line 1624 represents volume data collected from sensor 1324 versus time, and the line 1626 represents volume data collected from sensor 1326 versus time. These lines correspond to movement in the individual's torso during the video interview.

Reading the graph in 16A allows a user to see what the candidate's motion was like during the interview. When the individual turns away from a sensor, the body becomes more in profile, which means that the area of the base of the pyramid becomes smaller and the total volume of the pyramid become smaller. When the person turns toward a sensor, the torso becomes more straight on to the camera, which means that the area of the base of the pyramid becomes larger. When the line for the particular sensor is unchanged over a particular amount of time, it can be inferred that the individual's torso was not moving.

FIG. 16 B is a graph showing the individual's distance from the camera to the "center of mass lean," defined as the average value of the length of lines $\overline{EL}$ for the pyramids calculated for sensors 1322, 1324, 1326. From this simple graph, we might infer that the candidate felt particularly strongly about what they were saying because they leaned into the camera at that moment, or that they wished to create distance from their statements at times when they leaned away from the camera. In FIG. 16B, the line 1651 represents whether the individual is leaning in toward the camera or leaning away from the camera. When the value L is large, the individual can be inferred to be leaning in toward the camera. When the value L is small, the individual can be inferred to be leaning away from the camera, or slouching.

Method of Evaluating an Individual Based on a Baseline Measurement for the Individual In some examples, the system uses movement data in one segment of a candidate's video interview to evaluate the candidate's performance in a different part of the video interview. Comparing the candidate to themselves from one question to another provides valuable insight and does not need a large pool of candidates or computer-intensive analysis to analyze the movement of a large population.

In one aspect, the candidate's body posture and body motion are evaluated at the beginning of the interview, for example over the course of answering the first question. This measurement is used as a baseline, and the performance of the candidate during the interview is judged against the performance during the first interview question. This can be used to determine the portion of the interview in which the candidate feels the most comfortable. The system can then prioritize the use of that particular portion of the interview to show to hiring managers. Other uses could include deciding which portions of the behavioral data to use when calculating an empathy score for the candidate.

In this aspect, the system takes a first measurement of the individual at a first time. For example, the system could record posture data and calculate posture volume data for the candidate over the time period in which the candidate was answering the first interview question. This data can be analyzed to determine particular characteristics that the individual showed, such as the amount that the volume changed over time, corresponding to a large amount or small amount of motion. The system can also analyze the data to determine the frequency of volume changes. Quick, erratic volume changes can indicate different empathy traits versus slow, smooth volume changes. This analysis is then set as a baseline against which the other portions of the interview will be compared.

The system then takes a second measurement of the individual at a second time. This data is of the same type that was measured during the first time period. The system analyzes the data from the second time period in the same manner that the first data was analyzed. The analysis of the second data is then compared to the analysis of the first data to see whether there were significant changes between the two. This comparison can be used to determine which questions the candidate answered the best, and where the candidate was most comfortable speaking. This information then can be used to select which portion of the video interview to send to a hiring manager.

As used in this specification and the appended claims, the singular forms include the plural unless the context clearly dictates otherwise. The term "or" is generally employed in the sense of "and/or" unless the content clearly dictates otherwise. The phrase "configured" describes a system, apparatus, or other structure that is constructed or configured to perform a particular task or adopt a particular configuration. The term "configured" can be used interchangeably with other similar terms such as arranged, constructed, manufactured, and the like.

All publications and patent applications referenced in this specification are herein incorporated by reference for all purposes.

While examples of the technology described herein are susceptible to various modifications and alternative forms, specifics thereof have been shown by way of example and drawings. It should be understood, however, that the scope herein is not limited to the particular examples described. On the contrary, the intention is to cover modifications, equivalents, and alternatives falling within the spirit and scope herein.

What is claimed is:

1. A computer-implemented method of serving an audiovisual interview file to a user device over a communication network, the method comprising:
    (a) recording video input, audio input, and first behavioral data input of an interview for each of a plurality of candidates, each candidate having a digital profile in a candidate database stored in a non-transitory computer memory at a remote server, wherein the video input is recorded using a digital video camera, the audio input is recorded using a microphone, and the first behavioral data input is recorded using a depth sensor; wherein the video input, audio input, and first behavioral data input are recorded during a first time period and during a second time period;
    (b) assembling, by at least one computer processor, at least a portion of the video input and at least a portion of the audio input in a combined audiovisual interview file;
    (c) storing the combined audiovisual interview file in the candidate's respective digital profile in the candidate database;
    (d) extracting, by at least one computer processor, quantitative behavioral data from at least a portion of the first behavioral data input of each of the plurality of candidates at the first time period, wherein the quantitative behavioral data at the first time period comprises first time period posture volume data;
    (e) extracting, by at least one computer processor, quantitative behavioral data from at least a portion of the first behavioral data input of each of the plurality of candidates at the second time period, wherein the quantitative behavioral data at the second time period comprises second time period posture volume data;
    (f) determining an empathy score for each candidate among the plurality of candidates using weighted variables based on a correlation of empathy to the quantitative behavioral data;
    (g) storing each candidate's determined empathy score in the candidate's respective digital profile;
    (h) receiving, by the remote server over a communication network, a request from a user device to be served at least one audiovisual interview file for at least one of the plurality of candidates;
    (i) in response to receiving the request, automatically selecting, by at least one computer processor at the remote server, a digital profile for a selected candidate among the plurality of candidates, the selecting based at least in part on the quantitative behavioral data of the selected candidate and the selected candidate's empathy score;
    (j) analyzing a frequency of posture volume data changes in the first time period;
    (k) analyzing a frequency of posture volume data changes in the second time period;
    (l) comparing the frequency of posture volume data changes in the first time period and the frequency of posture volume data changes in the second time period;
    (m) selecting, by the remote server, a first portion of the selected candidate's combined audiovisual interview file based on comparing the frequency of posture volume data changes in the first time period and the second time period;
    (n) prioritizing, by the remote server, the first portion of the selected candidate's combined audiovisual interview and sending the prioritized first portion over the communication network to be displayed by the user device.

2. The method of claim 1, further comprising:
    extracting speech to text output from a portion of the audio input using speech to text analysis, wherein the digital profile for the selected candidate is further selected at least in part based on the speech to text output, wherein the speech to text output is aligned in time with the first behavioral data input, and
    analysis of the first behavioral data input about a subject matter, wherein the subject matter was determined from the speech to text output aligned in time with the first behavioral data; wherein selecting of the first portion of the selected candidate's combined audiovisual interview is further based on the analysis of the first behavioral data input about the subject matter.

3. The method of claim 1, wherein the quantitative behavioral data extracted from the behavioral data input is a first type of behavioral data, the method further comprising the step of extracting a second type of quantitative behavioral data from the video input, the audio input, or the first behavioral data input, wherein the second type of quantitative behavioral data includes at least one of facial expression, vocal tone patterns, speech cadence, or length of time of speaking.

4. The method of claim 1, further comprising:
    for each candidate, receiving resume text and storing the text in the candidate's digital profile;
    analyzing the resume text to determine a career engagement score for each candidate; and
    in response to receiving the request to be served at least one combined audiovisual interview file, selecting the digital profile for the selected candidate among the plurality of candidates further based at least in part on content in the resume text.

5. The method of claim 1, further comprising:
    applying an empathy score model to the quantitative behavioral data to determine the empathy score, wherein the empathy score model is generated by:
        recording, by one or more behavioral data sensors, a plurality of interview recordings of individuals in a control group;
        extracting a set of behavioral data from the interview recordings, the set of behavioral data corresponding to multiple quantitative behavioral variables recorded by the one or more behavioral data sensors;
        performing a regression analysis on the set of behavioral data of the control group to determine one or more statistically relevant quantitative behavioral variables; and
    selecting a subset of quantitative behavioral variables to be used in the empathy score model;
    wherein the quantitative behavioral data extracted from the interview recording of each of the plurality of candidates corresponds to the selected subset of quantitative behavioral variables.

6. The method of claim 1, wherein the quantitative behavioral data comprises measurements of motion of the candidate's torso, wherein analyzing the frequency of posture volume data changes in the first time period and second time period comprises analyzing motion of the candidate's torso.

7. The method of claim 6, wherein the quantitative behavioral data comprises center of mass lean measurements, wherein analyzing the frequency of posture volume data changes in the first time period and second time period comprises analyzing the candidate's center of mass lean.

8. The method of claim 6, wherein the quantitative behavioral data comprises frequency of torso motion measurements, wherein analyzing the frequency of posture volume data changes in the first time period and second time period comprises analyzing the frequency of the candidate's torso motion.

9. The method of claim 6, wherein the quantitative behavioral data measures a magnitude of torso movement, the method further comprising analyzing the magnitude of candidate's torso movement in the first time period and the second time period.

10. The method of claim 1, wherein the behavioral data input is recorded by two or more depth sensors positioned at different locations in relation to the candidate's torso.

11. The method of claim 1, wherein the video input, audio input, and behavioral data input are recorded synchronously during a time interval.

12. The method of claim 1, wherein posture volume data comprises the position of the candidate's right shoulder, left shoulder, left waistline, and right waistline.

13. The method of claim 12, wherein the posture volume data further comprises the position of the depth sensor.

14. A computer-implemented method of serving an audiovisual interview file to a user device over a communication network, the method comprising:
 (a) compiling an empathy score model using weighted variables based on a correlation of empathy to behavioral data;
 (b) recording a plurality of audiovisual interviews of a plurality of candidates by:
  (i) prompting each candidate to answer an interview question;
  (ii) recording video input and audio input of each candidate's answer to the interview question;
  (iii) recording behavioral data input, by a depth sensor, during each candidate's answer to the interview question, the behavioral data input recorded synchronously with the video input, wherein the video input, audio input and behavioral data input are recorded during a first time period and during a second time period, wherein the first time period follows a first interview question and the second time period follows a second interview question;
  (iv) for each candidate, storing at least a portion of the video input and at least a portion of the audio input as a combined audiovisual interview file in a candidate profile in a candidate database on a non-transitory computer memory; and
 (c) extracting quantitative behavioral data from the behavioral data input for each candidate at the first time period, wherein the quantitative behavioral data at the first time period comprises first time period posture volume data;
 (d) extracting quantitative behavioral data from the behavioral data input for each candidate at the second time period, wherein the quantitative behavioral data at the second time period comprises second time period posture volume data;
 (e) applying the empathy score model to the quantitative behavioral data to determine an empathy score for each candidate;
 (f) storing each candidate's determined empathy score in the candidate's respective digital profile;
 (g) receiving a request from a user device to view a profile for a candidate among the plurality of candidates, wherein the request is received by a remote server over a communication network;
 (h) in response to receiving the request, the remote server automatically selecting a candidate from among the plurality of candidates, the selection based in part on the quantitative behavioral data for the plurality of candidates and the selected candidate's empathy score;
 (i) analyzing a frequency of posture volume data changes in the first time period;
 (j) analyzing a frequency of posture volume data changes in the second time period;
 (k) comparing the frequency of posture volume data changes in the first time period and the frequency of posture volume data changes in the second time period;
 (l) selecting, by the remote server, a portion of the selected candidate's combined audiovisual interview file based on comparing the frequency of posture volume data changes in the first time period and the second time period; and
 (m) prioritizing, by the remote server, the selected portion of the selected candidate's combined audiovisual interview and sending the prioritized selected portion over the communication network to be displayed by the user device.

15. The method of claim 14, wherein each audiovisual interview file contains video recorded by at least two different cameras.

16. The method of claim 15, wherein the first behavioral data input includes data input received from at least two different depth sensors.

17. A computer-implemented method of serving an audiovisual interview file to a user device over a communication network, the method comprising:
 (a) recording video input, audio input, and first behavioral data input of an interview for each of a plurality of candidates, each candidate having a digital profile in a candidate database stored in a non-transitory computer memory at a remote server, wherein the video input is recorded using a digital video camera, the audio input is recorded using a microphone, and the first behavioral data input is recorded using a depth sensor; wherein the video input, audio input, and first behavioral data input are recorded during a first time period and during a second time period;
 (b) assembling, by at least one computer processor, at least a portion of the video input and at least a portion of the audio input in a combined audiovisual interview file;
 (c) storing the combined audiovisual interview file in the candidate's respective digital profile in the candidate database;
 (d) extracting, by at least one computer processor, quantitative behavioral data from at least a portion of the first behavioral data input of each of the plurality of candidates at the first time period, wherein the quantitative behavioral data at the first time period comprises first time period posture volume data;
 (e) extracting, by at least one computer processor, quantitative behavioral data from at least a portion of the first behavioral data input of each of the plurality of candidates at the second time period, wherein the quantitative behavioral data at the second time period comprises second time period posture volume data;
 (f) determining a score for each candidate among the plurality of candidates using weighted variables based on a correlation of a desired employment quality to the quantitative behavioral data;

(g) storing each candidate's determined score in the candidate's respective digital profile;

(h) receiving, by the remote server over a communication network, a request from a user device to be served at least one audiovisual interview file for at least one of the plurality of candidates;

(i) in response to receiving the request, automatically selecting, by at least one computer processor at the remote server, a digital profile for a selected candidate among the plurality of candidates, the selecting based at least in part on the quantitative behavioral data of the selected candidate and the selected candidate's score;

(j) analyzing a frequency of posture volume data changes in the first time period;

(k) analyzing a frequency of posture volume data changes in the second time period;

(l) comparing the frequency of posture volume data changes in the first time period and the frequency of posture volume data changes in the second time period;

(m) selecting, by the remote server, a first portion of the selected candidate's combined audiovisual interview file based on comparing the frequency of posture volume data changes in the first time period and the second time period;

(n) prioritizing, by the remote server, the first portion of the selected candidate's combined audiovisual interview and sending the prioritized first portion over the communication network to be displayed by the user device.

* * * * *